(12) United States Patent
Tsukamoto

(10) Patent No.: US 10,656,772 B2
(45) Date of Patent: May 19, 2020

(54) WIRING AND TOUCH PANEL SENSOR

(71) Applicant: FUJIFILM Corporation, Tokyo (JP)

(72) Inventor: Naoki Tsukamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 105 days.

(21) Appl. No.: 15/782,944

(22) Filed: Oct. 13, 2017

(65) Prior Publication Data

US 2018/0046288 A1 Feb. 15, 2018

Related U.S. Application Data

(63) Continuation of application No. PCT/JP2016/061778, filed on Apr. 12, 2016.

(30) Foreign Application Priority Data

Apr. 20, 2015 (JP) ................. 2015-085710

(51) Int. Cl.
*G06F 3/047* (2006.01)
*G06F 3/044* (2006.01)
(Continued)

(52) U.S. Cl.
CPC ............ *G06F 3/047* (2013.01); *G02F 1/1343* (2013.01); *G02F 1/13338* (2013.01);
(Continued)

(58) Field of Classification Search
CPC ........ G06F 3/041; G06F 3/0412; G06F 3/044; G06F 3/047; G06F 2203/04112; G02F 1/13338; G02F 1/1343; G02F 2001/3505
(Continued)

(56) References Cited

U.S. PATENT DOCUMENTS 5,210,380 A * 5/1993 McDermott ............ G06F 3/041
178/18.07
9,513,758 B2 * 12/2016 Fix .......................... G06F 3/047
(Continued)

FOREIGN PATENT DOCUMENTS

CN 102027801 A 4/2011
CN 102592715 A 7/2012
(Continued)

OTHER PUBLICATIONS

International Search Report issued in PCT/JP2016/061778; dated Jun. 28, 2016.
(Continued)

*Primary Examiner* — Jason M Mandeville
(74) *Attorney, Agent, or Firm* — Studebaker & Brackett PC

(57) ABSTRACT

A conductive film includes: a substrate; a plurality of first wavy wires which have semicircular arcs arranged opposite to each other in direction on the substrate; and a plurality of second wavy wires which have the semicircular arcs arranged opposite to each other in direction and are symmetrical to the first wavy wires in an arrangement direction, and has a conductive sheet body in which an arrangement direction of the arcs of each first wavy wire and an arrangement direction of the arcs of each second wavy wire are made parallel to each other, each first wavy wire and each second wavy wire are separated by a previously set distance, and the arcs of each first wavy wire and the arcs of each second wavy wire facing each other are at least in contact with each other. The first wavy wire and the second wavy wire are made of a conductive material. A wiring has the conductive film. A touch panel sensor also has the conductive film.

8 Claims, 23 Drawing Sheets

(51) Int. Cl.
   *G02F 1/1333*   (2006.01)
   *G02F 1/1343*   (2006.01)
   *G06F 3/041*    (2006.01)
   *G02F 1/35*     (2006.01)

(52) U.S. Cl.
   CPC ............ *G06F 3/044* (2013.01); *G06F 3/0412* (2013.01); *G02F 2001/3505* (2013.01); *G06F 2203/04112* (2013.01)

(58) Field of Classification Search
   USPC ........................................ 345/173; 178/18.03
   See application file for complete search history.

(56) References Cited

U.S. PATENT DOCUMENTS

| | | | |
|---|---|---|---|
| 2009/0255723 A1 | 10/2009 | Lai | |
| 2010/0200286 A1* | 8/2010 | Melcher | G02F 1/155 174/261 |
| 2011/0062146 A1* | 3/2011 | Kuriki | H05B 3/84 219/553 |
| 2011/0102361 A1* | 5/2011 | Philipp | G06F 3/044 345/174 |
| 2012/0138342 A1 | 6/2012 | Muramoto et al. | |
| 2012/0187821 A1* | 7/2012 | Lee | H01L 51/5212 313/498 |
| 2013/0063371 A1* | 3/2013 | Lee | G06F 3/044 345/173 |
| 2014/0307178 A1* | 10/2014 | Tang | G06F 3/044 349/12 |
| 2014/0376166 A1* | 12/2014 | Kokai | G06F 3/039 361/679.3 |
| 2015/0002464 A1 | 1/2015 | Nishioka et al. | |
| 2015/0242013 A1 | 8/2015 | Ono et al. | |
| 2015/0378484 A1* | 12/2015 | Orita | G06F 3/044 345/174 |
| 2016/0192477 A1 | 6/2016 | Chung et al. | |

FOREIGN PATENT DOCUMENTS

| | | |
|---|---|---|
| CN | 102598891 A | 7/2012 |
| CN | 103412668 A | 11/2013 |
| JP | 2009-302035 A | 12/2009 |
| JP | 2011-028985 A | 2/2011 |
| JP | 2012-144761 A | 8/2012 |
| JP | 2013-149236 A | 8/2013 |
| JP | 2013-235593 A | 11/2013 |
| JP | 2014-029614 A | 2/2014 |
| JP | 2014-115694 A | 6/2014 |
| JP | 2014-159620 A | 9/2014 |
| JP | 2015-022397 A | 2/2015 |
| TW | M476985 U | 4/2014 |
| WO | 2013/133026 A1 | 9/2013 |
| WO | 2014/050306 A1 | 4/2014 |
| WO | 2014/136455 A1 | 9/2014 |
| WO | 2015/002515 A1 | 1/2015 |

OTHER PUBLICATIONS

Written Opinion issued in PCT/JP2016/061778; dated Jun. 28, 2016.
An Office Action mailed by the State Intellectual Property Office of People's Republic of China dated Nov. 4, 2019, which corresponds to Chinese Patent Application No. 201680021775.4 and is related to U.S. Appl. No. 15/782,944.
An Office Action issued by Taiwan Intellectual Property Office dated Jan. 8, 2020, which corresponds to Taiwanese Patent Application No. 105111732 and is related to U.S. Appl. No. 15/782,944.

* cited by examiner

WIRING AND TOUCH PANEL SENSOR

CROSS-REFERENCE TO RELATED APPLICATIONS

This application is a Continuation of PCT International Application No. PCT/JP2016/061778 filed on Apr. 12, 2016, which claims priority under 35 U.S.C. § 119(a) to Japanese Patent Application No. 2015-085710 filed on Apr. 20, 2015. The above application is hereby expressly incorporated by reference, in its entirety, into the present application.

BACKGROUND OF THE INVENTION

1. Field of the Invention

The present invention relates to a conductive film having a conductive thin wire formed therein, a wiring having the conductive film, and a touch panel sensor having the conductive film, and particularly, to a conductive film, a wiring, and a touch panel sensor having excellent visibility.

2. Description of the Related Art

Conductive films having a conductive thin wire formed on a substrate have been widely used for transparent electrodes of various electronic devices such as solar cells, inorganic electroluminescence (inorganic EL) devices, and organic electroluminescence (organic EL) devices, electromagnetic wave shields of various display devices, touch panels, transparent surface heating elements, and the like. Particularly, in recent years, the rate of mounting a touch panel on a cellular phone or a portable game device has been increased, and the demand for a conductive film for a capacitance type touch panel in which multi-point detection is possible has been expanded.

A transparent conductive oxide such as an indium tin oxide (ITO) is used for a conductive thin wire. A transparent conductive oxide has low visibility, and is thus suitable for touch panels or the like which are disadvantageous in a case where an electrode pattern is shown. However, the sheet resistance of a transparent conductive oxide is about 10 to 100Ω/□, and this is not suitable for increasing an area and sensitivity.

In a case of a metal, patterning is more easily performed than in a case of the above-described transparent conductive oxide, and there are advantages such as excellent flexibility and low resistance. Therefore, a metal such as copper or silver is used for a conductive thin wire in a touch panel or the like.

JP2014-115694A discloses a touch panel using a metal thin wire. The touch panel in JP2014-115694A is a capacitance sensor (touch sensor, input device) provided with a base material, a plurality of Y-electrode patterns, a plurality of X-electrode patterns, a plurality of jumper insulating layers, a plurality of jumper wirings, and a transparent insulating layer.

Each of the plurality of Y-electrode patterns has a substantially rhombus shape. The plurality of Y-electrode patterns are arranged in matrix in an X-direction and a Y-direction on a surface of the base material such that apexes thereof are opposed to each other.

Two types of metal thin wires inclined in a linear symmetrical manner about a Y-direction are allowed to cross in a grid shape to form a mesh. The plurality of X-electrode patterns have a substantially rhombus shape which is the same as the Y-electrode patterns.

SUMMARY OF THE INVENTION

In touch panels in which a plurality of Y-electrode patterns and a plurality of X-electrode patterns having a substantially rhombus shape are formed using metal thin wires as in JP2014-115694A, strip-like light reflection may occur due to ambient light having high directivity in a case where the touch panel is visually confirmed. The strip-like light reflection causes a reduction in visibility. It is desirable to prevent the above-described strip-like light reflection causing a reduction in visibility and to further improve visibility.

An object of the invention is to solve problems based on the above-described related art, and to provide a conductive film, a wiring, and a touch panel sensor having excellent visibility.

In order to achieve the above-described object, according to a first aspect of the invention, there is provided a conductive film comprising: a substrate; a plurality of first wavy wires which are disposed on the substrate and have semicircular arcs arranged opposite to each other in direction; and a plurality of second wavy wires which are disposed on the substrate, have the semicircular arcs arranged opposite to each other in direction, and are symmetrical to the first wavy wires in an arrangement direction, in which a conductive sheet body is provided in which an arrangement direction of the arcs of each first wavy wire and an arrangement direction of the arcs of each second wavy wire are made parallel to each other, each first wavy wire and each second wavy wire are separated by a previously set distance, and the arcs of each first wavy wire and the arcs of each second wavy wire facing each other are at least in contact with each other, and the first wavy wire and the second wavy wire are made of a conductive material.

Each first wavy wire and each second wavy wire may have a configuration in which the arcs of each first wavy wire and the arcs of each second wavy wire facing each other overlap each other. The semicircular arc includes an arc having a central angle of 170° to 190°. The conductive material is made of a metal or an alloy and may have a configuration in which a plurality of conductive sheet bodies are laminated. In a case where the plurality of conductive sheet bodies are laminated, arrangement directions of the conductive sheet bodies are preferably made to coincide with each other. In addition, the substrate is preferably a transparent substrate.

According to a second aspect of the invention, there is provided a wiring comprising: the conductive film according to the first aspect of the invention. A conduction path can be formed by cutting the film in a direction parallel to or perpendicular to the arrangement direction of the conductive film, and in a case where in the conductive film, at least one of the first wavy wire or the second wavy wire is cut at an angle γ which is formed with respect to the arrangement direction in a range of greater than 0° to less than 90° in terms of an absolute value to form a conduction path, the angle γ is preferably made to coincide with an arrangement angle ϕ defined by |tan ϕ|=P/Da, where Da is a diameter of the arc and P is an interval between the first wavy wire and the second wavy wire in a direction orthogonal to the arrangement direction, to cut the first wavy wire and the second wavy wire.

According to a third aspect of the invention, there is provided a touch panel sensor comprising: the conductive film according to the first aspect of the invention.

The conductive film is preferably used for at least one of a sensor part or a peripheral wiring part.

According to a conductive film of the invention, a product having excellent visibility is obtained.

According to a wiring of the invention, a product having excellent visibility is obtained.

According to a touch panel sensor of the invention, a product having excellent visibility is obtained.

DESCRIPTION OF THE PREFERRED EMBODIMENTS

Hereinafter, a conductive film, a wiring, and a touch panel sensor according to the invention will be described in detail based on suitable embodiments illustrated in the accompanying drawings.

In the following description, the expression "to" which means a numerical value range includes numerical values before and after the expression. For example, in a case where ε is a numerical value α to a numerical value β, the range of ε includes the numerical values α and β, and is expressed as $\alpha \le \varepsilon \le \beta$ using mathematical symbols.

Optically transparent and simply transparent are that in a visible light wavelength range of 400 to 800 nm, the light transmittance is at least 60% or greater, preferably 80% or greater, more preferably 85% or greater, and even more preferably 90% or greater.

The light transmittance is measured using, for example, "Plastics—Determination Of Total Luminous Transmittance And Reflectance" specified in JIS K 7375:2008.

The expressions "substantially" and "simultaneously" include an error range which is generally allowable in the technical field.

Figure 1:
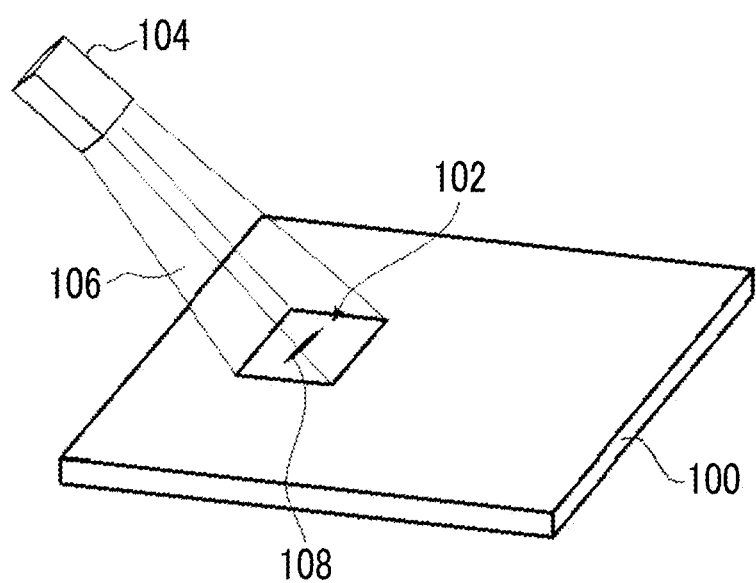
FIG. 1 is a schematic diagram for illustrating strip-like light reflection.

FIG. 1 is a schematic diagram for illustrating strip-like light reflection.

As illustrated in FIG. 1, in a case where a region 102 where a pattern is formed using a metal thin wire on a substrate 100 is irradiated with light having high directivity from a light source 104, strip-like reflected light 108 may be visually recognized in the region 102 regardless of the irradiation direction and the visual recognition direction. The strip-like reflected light 108 is called splash. The strip-like reflected light 108, that is, splash inhibits visibility, and the visibility deteriorates in a case where the splash occurs. A conductive film according to the invention suppresses the occurrence of splash and has enhanced visibility.

The light having directivity is light from a light emitting diode, and does not include natural light such as sunlight, light from a fluorescent lamp, light from an incandescent light bulb, and light from an incandescent lamp. The light from a light emitting diode includes monochromatic light and white light.

Next, a conductive film according to an embodiment of the invention will be described.

Figure 2:
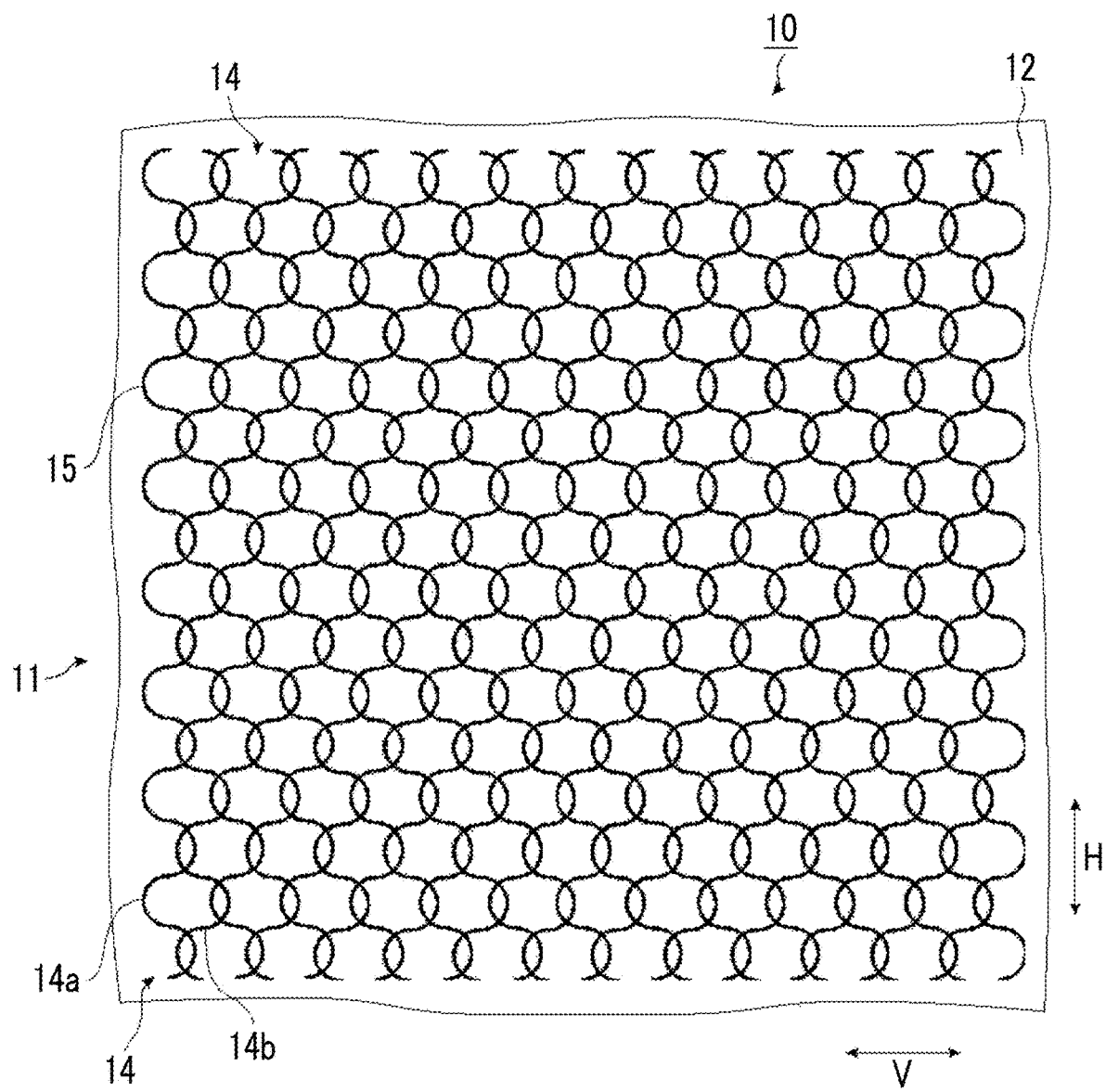
FIG. 2 is a schematic plan view illustrating a conductive film according to an embodiment of the invention.
Figure 3:
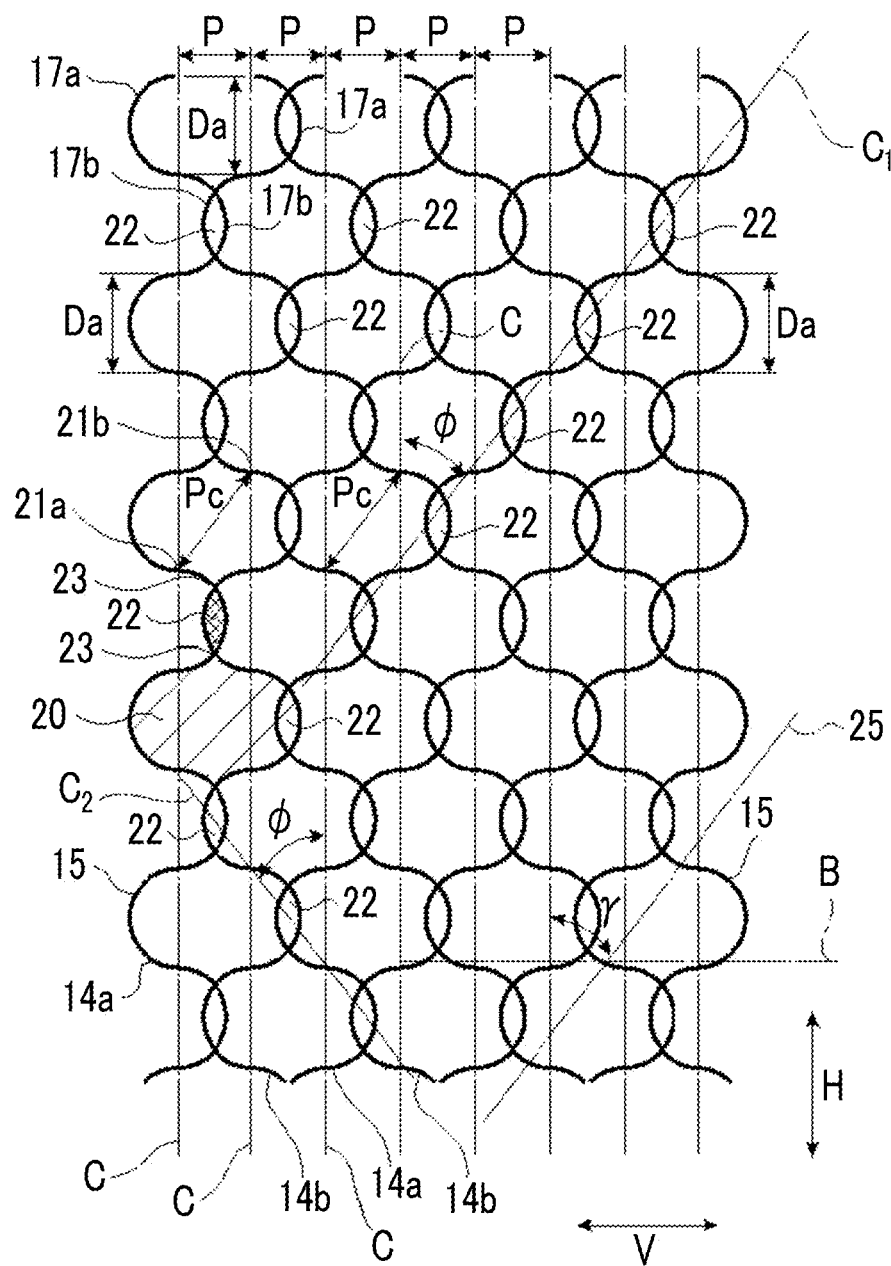
FIG. 3 is an enlarged plan view illustrating the conductive film according to the embodiment of the invention.
Figure 4:
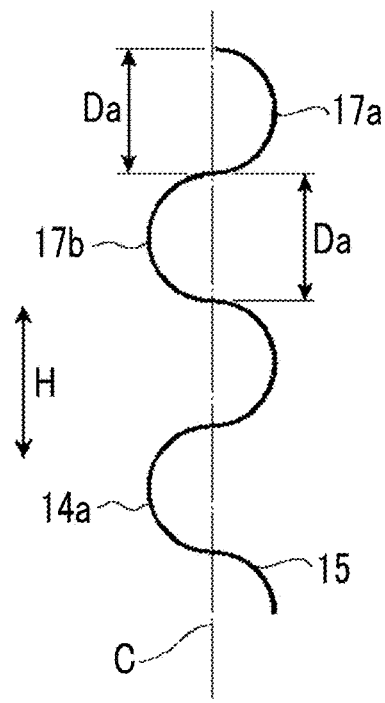
FIG. 4 is a schematic diagram illustrating a conductive thin wire of a pattern of the conductive film according to the embodiment of the invention.
Figure 5:
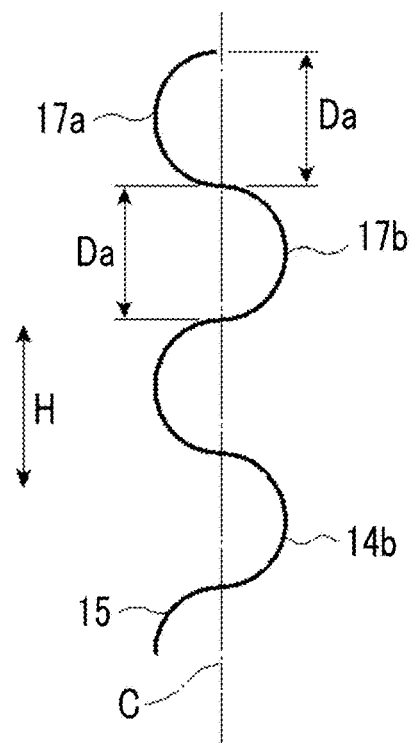
FIG. 5 is a schematic diagram illustrating a conductive thin wire of the pattern of the conductive film according to the embodiment of the invention.
Figure 6:
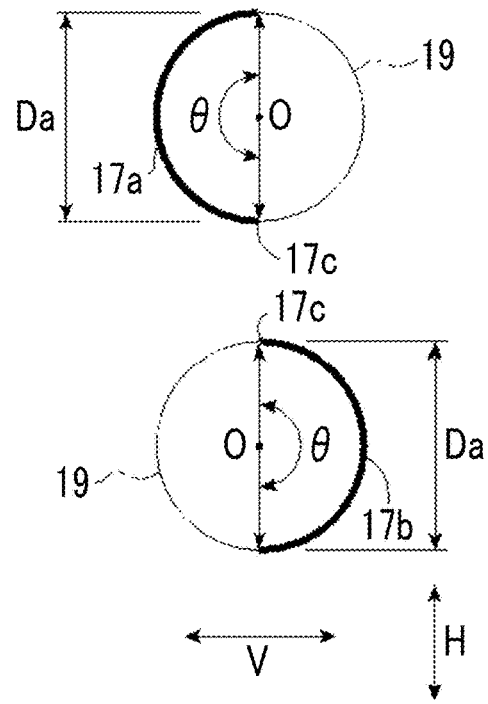
FIG. 6 is a schematic diagram for illustrating the pattern of the conductive film according to the embodiment of the invention.
Figure 7:
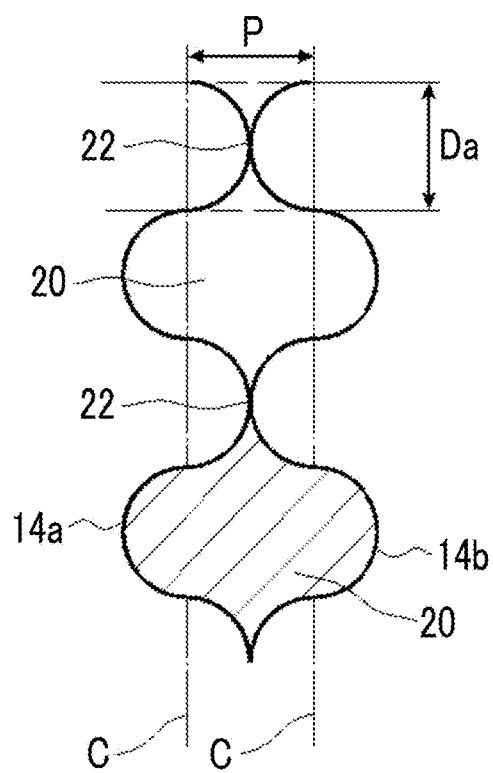
FIG. 7 is a schematic diagram illustrating another example of the conductive film according to the embodiment of the invention.

FIG. 2 is a schematic plan view illustrating a conductive film according to an embodiment of the invention. FIG. 3 is an enlarged plan view illustrating the conductive film according to the embodiment of the invention. FIG. 4 is a schematic diagram illustrating a conductive thin wire of the pattern of the conductive film according to the embodiment of the invention. FIG. 5 is a schematic diagram illustrating a conductive thin wire of the pattern of the conductive film according to the embodiment of the invention. FIG. 6 is a schematic diagram for illustrating the pattern of the conductive film according to the embodiment of the invention. FIG. 7 is a schematic diagram illustrating another example of the conductive film according to the embodiment of the invention.

A conductive film 10 illustrated in FIG. 2 has a conductive sheet body 11 in which a plurality of pattern wirings 14 extending in an H-direction overlaps each other and is aligned in a V-direction on a substrate 12. The substrate 12 is, for example, a transparent substrate.

As illustrated in FIGS. 2 and 3, the pattern wiring 14 is composed of a first wavy wire 14a extending in the H-direction and a second wavy wire 14b extending in the H-direction, and has no linear part. Each of the first wavy wire 14a and the second wavy wire 14b is formed of a conductive thin wire 15.

The first wavy wire 14a has semicircular arcs 17a and 17b arranged opposite to each other in direction as illustrated in FIG. 4. Both of the semicircular arcs 17a and 17b have a diameter Da. The semicircular arcs 17a and 17b are arranged in the H-direction, and in this specification, the arrangement direction of the semicircular arcs is the H-direction.

The second wavy wire 14b has semicircular arcs 17a and 17b arranged opposite to each other in direction as illustrated in FIG. 5. Both of the semicircular arcs 17a and 17b have a diameter Da. The arrangement direction of the semicircular arcs 17a and 17b is also the H-direction. The second wavy wire 14b is obtained by shifting the phase of the first wavy wire 14a by the diameter Da of the arc.

As illustrated in FIG. 6, a semicircular arc 17a is half of the outer periphery of a virtual circle 19 having a diameter Da, and a semicircular arc 17b is symmetrical to the semicircular arc 17a and is likewise half of the outer periphery of a virtual circle 19 having a diameter Da. By connecting an end part 17c of the semicircular arc 17a and an end part 17c of the semicircular arc 17b, a first wavy wire 14a and a second wavy wire 14b, the arc directions of which are opposite to each other, are formed. Regarding the semicircular arcs 17a and 17b, in a case where a center of the virtual circle 19 is represented by O and a central angle is represented by θ, the central angle θ is 180° and is π (radian) in a case where the angle is expressed in radian units. It is ideal for a semicircular arc to have a central angle θ of 180°.

However, in the invention, a semicircular arc has a central angle θ of 170° to 190° in consideration of errors and the like.

In both of the first wavy wire 14a and the second wavy wire 14b, one semicircular arc 17a and one semicircular arc 17b are connected to form one waveform pattern cycle. By connecting waveform patterns, the first wavy wire 14a and the second wavy wire 14b can be formed.

In the first wavy wire 14a and the second wavy wire 14b, a line connecting end parts 17c of semicircular arcs 17a is a central line C.

The second wavy wire 14b is symmetrical to the first wavy wire 14a in the arrangement direction, that is, the H-direction. As described above, the first wavy wire 14a and the second wavy wire 14b are symmetrical to each other with respect to the central line C, and the semicircular arcs 17b are opposed to each other as illustrated in FIG. 3. In addition, the first wavy wire 14a and the second wavy wire 14b are disposed such that ends of the arcs 17a and 17b coincide with each other with respect to a set line B.

The arrangement direction of the arcs 17a and 17b of the first wavy wire 14a and the arrangement direction of the arcs 17a and 17b of the second wavy wire 14b are parallel to each other. That is, the central lines C are made parallel to each other to separate the first wavy wire 14a and the second wavy wire 14b by a previously set distance. The arcs 17a of the first wavy wire 14a and the arcs 17a of the second wavy wire 14b facing each other are disposed to overlap each other in a direction orthogonal to the arrangement direction, that is, the V-direction. The arcs 17a disposed to mutually protrude are disposed to overlap each other. In this case, an interval between the central line C of the first wavy wire 14a and the central line C of the second wavy wire 14b in the V-direction is a pitch P.

As illustrated in FIG. 3, an overlap region 22 is formed which is surrounded by semicircular arcs 17a. A point at which mutual semicircular arcs 17a overlap each other is an intersection 23. An opening 20 is composed of an arc 17b of a first wavy wire 14a and an arc 17b of a second wavy wire 14b which are disposed to be mutually recessed. The opening 20 includes the overlap region 22. A condition for forming the overlap region 22 is Pitch P<Diameter Da of arc, and a condition for forming the opening 20 is that P≤Da in terms of the geometric relationship between the first wavy wire 14a and the second wavy wire 14b. Here, in a case of P=Da, the first wavy wire 14a and the second wavy wire 14b are in contact with each other as illustrated in FIG. 7, and thus the region 22 exists as a contact point and is included in the invention.

In the conductive film 10 illustrated in FIG. 3, in a state in which central lines C of a plurality of first wavy wires 14a and a plurality of second wavy wires 14b are parallel to each other, the first wavy wires 14a and the second wavy wires 14b alternately opposed to each other at a pitch P in the V-direction in an order of a first wavy wire 14a, a second wavy wire 14b, a first wavy wire 14a, and a second wavy wire 14b have arcs disposed to mutually protrude and to overlap each other. The first wavy wire 14a and the second wavy wire 14b may be at least in contact with each other as illustrated in FIG. 7, and are not necessarily required to overlap each other as illustrated in FIG. 3.

Here, an arrangement angle φ of overlap regions 22 is an angle formed between a line $C_1$ passing through the centers of a plurality of overlap regions 22 and a line parallel to the H-direction, that is, the central line C. An angle formed between a line $C_2$ passing through the centers of a plurality of overlap regions 22 and the central line C is also the arrangement angle $\phi$. The arrangement angles $\phi$ of a plurality of overlap regions 22 can take a plurality of directions. Accordingly, the arrangement angle $\phi$ is defined by an absolute value. The arrangement angle $\phi$ is represented as $|\tan \phi|=(P/Da)$ and is also represented as $|\phi|=\tan^{-1}(P/Da)$. Accordingly, the arrangement angle $\theta$ of the overlap regions 22 can be changed by changing the diameter Da of the arc and the pitch P between the first wavy wire 14a and the second wavy wire 14b.

The diameter Da is preferably 1 to 1,000 μm.

The pitch P is preferably 1 to 1,000 μm.

It is not preferable that the diameter Da is greater than 1,000 μm since splash, the shape of which is not limited, is shown. In addition, in a case where a distance between an intersection 21a at which an arc 17b of a first wavy wire 14a and a central line C intersect and an intersection 21b at which an arc 17b of a second wavy wire 14b and a central line C intersect is represented by Pc, it is preferable that the distance Pc is 150 μm or less since the first wavy wire 14a and the second wavy wire 14b of the pattern wiring 14 are not easily visually recognized. In a case where the distance Pc is short, the opening area is small, and thus the transmittance may be reduced or haze may occur. Therefore, the distance Pc is preferably 50 μm or greater.

In the first wavy wire 14a and the second wavy wire 14b opposed to each other, arcs disposed to mutually protrude are disposed to be at least in contact with each other, and a condition for contact is P≤Da.

In the conductive film 10 illustrated in FIG. 2, the pattern wirings 14 illustrated in FIG. 2 are aligned to partially overlap each other in the V-direction. That is, first wavy wires 14a and second wavy wires 14b having no linear part are alternately disposed to partially overlap each other in the V-direction as described above. Thus, the occurrence of the above-described splash can be suppressed even in a case where the first wavy wire 14a and the second wavy wire 14b are made of a conductive material such as a metal or an alloy.

Figure 8:
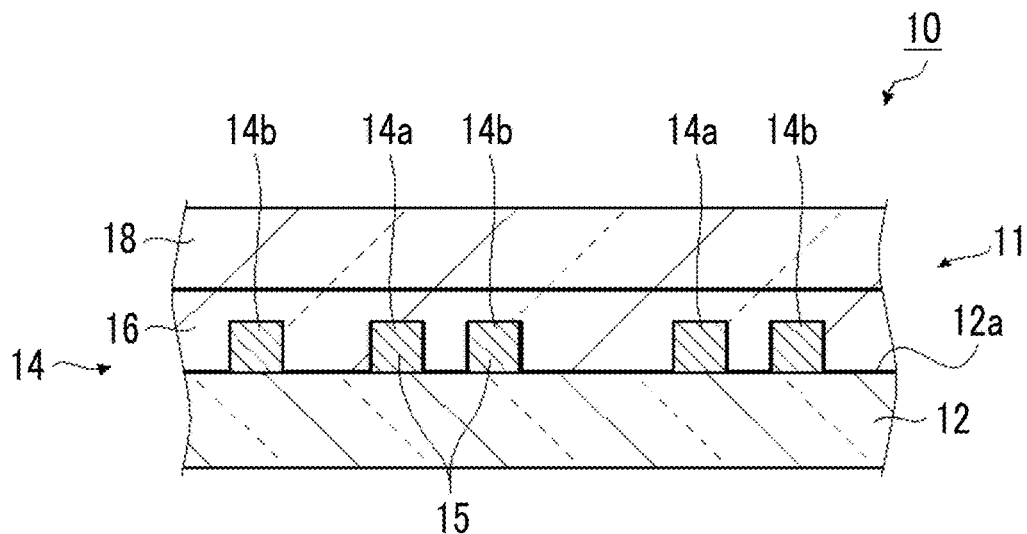
FIG. 8 is a schematic cross-sectional view illustrating a configuration of the conductive film according to the embodiment of the invention.

The conductive film 10 has, for example, a configuration illustrated in FIG. 8. As illustrated in FIG. 8, first wavy wires 14a and second wavy wires 14b are formed on a front surface 12a of a substrate 12 to provide pattern wirings 14. A protective layer 18 is provided on the pattern wirings 14 with a transparent adhesive layer 16 interposed therebetween.

The substrate 12 supports the first wavy wires 14a and the second wavy wires 14b and is made of, for example, an electrical insulating material. In addition, the substrate 12 is, for example, a transparent substrate. Therefore, for example, a plastic film, a plastic plate, a glass plate, or the like can be used as the substrate 12. Examples of the material of a plastic film and a plastic plate include polyesters such as polyethylene terephthalate (PET) and polyethylene naphthalate (PEN), polyolefins such as polyethylene (PE), polypropylene (PP), polystyrene, ethylene vinyl acetate (EVA), cycloolefin polymer (COP), and cycloolefin copolymer (COC), vinyl-based resins, polycarbonate (PC), polyamide, polyimide, acrylic resins, and triacetylcellulose (TAC). Polyethylene terephthalate (PET) and polyolefins such as cycloolefin polymer (COP) and cycloolefin copolymer (COC) are preferably used from the viewpoint of light-transmitting property, heat shrinking property, and workability. From the viewpoint of adhesiveness, scratch resistance, and handleability, an easy-adhesive layer may be laminated, or an easy-adhesive layer and a hard coating layer may be laminated on the substrate 12.

As the substrate 12, a treated support subjected to at least one of an atmospheric pressure plasma treatment, a corona discharge treatment, and an ultraviolet irradiation treatment can be used. Through the above-described treatments, a hydrophilic group such as an OH group is introduced to a surface of the treated support, and thus adhesiveness between the first wavy wire 14a and the second wavy wire 14b is further improved. Among the above-described treatments, an atmospheric pressure plasma treatment is preferable in view of further improving the adhesiveness between the first wavy wire 14a and the second wavy wire 14b.

The conductive thin wire 15 is made of a conductive material, and examples thereof include metals, alloys, and compounds. As the conductive thin wire 15, a material which is generally used as a conductor can be appropriately used, and its composition is not particularly limited. The conductive thin wire 15 is made of, for example, gold (Au), silver (Ag), copper (Cu), nickel (Ni), titanium (Ti), palladium (Pd), platinum (Pt), aluminum (Al), tungsten (W), or molybdenum (Mo). An oxide (O), a nitride (N), a phosphide (P), or a sulfide (S) thereof may also be included. In addition, an alloy thereof may also be included. The conductive thin wire 15 may be made of a material including a binder in addition to gold (Au), silver (Ag), or copper (Cu), and this material is also included in the conductive thin wire 15. In a case where the conductive thin wire 15 includes a binder, the conductive thin wire is easily bent and has improved bending resistance. A material which is used in the wiring of a conductive film can be appropriately used as a binder, and for example, a material described in JP2013-149236A can be used. The conductive thin wire 15 is a metal thin wire in a case where the conductive thin wire is made of a metal or an alloy.

For the adhesive layer 16, for example, an optically transparent pressure sensitive adhesive, called an optically clear adhesive (OCA), or an optically transparent resin such as an ultraviolet curable resin, called an optically clear resin (OCR) is used.

The protective layer 18 is provided to protect the first wavy wire 14a and the second wavy wire 14b. The base material of the protective layer 18 is not particularly limited. For example, glass, polycarbonate (PC), polyethylene terephthalate (PET), an acrylic resin (PMMA), or the like can be used. As in a case of the substrate 12, an easy-adhesive layer may be laminated, or an easy-adhesive layer and a hard coating layer may be laminated on a surface of the protective layer 18.

The conductive film 10 illustrated in FIG. 2 has one conductive sheet body 11, but the configuration thereof is not limited thereto. A conductive film obtained by laminating a plurality of conductive sheet bodies may be used.

Figure 9:
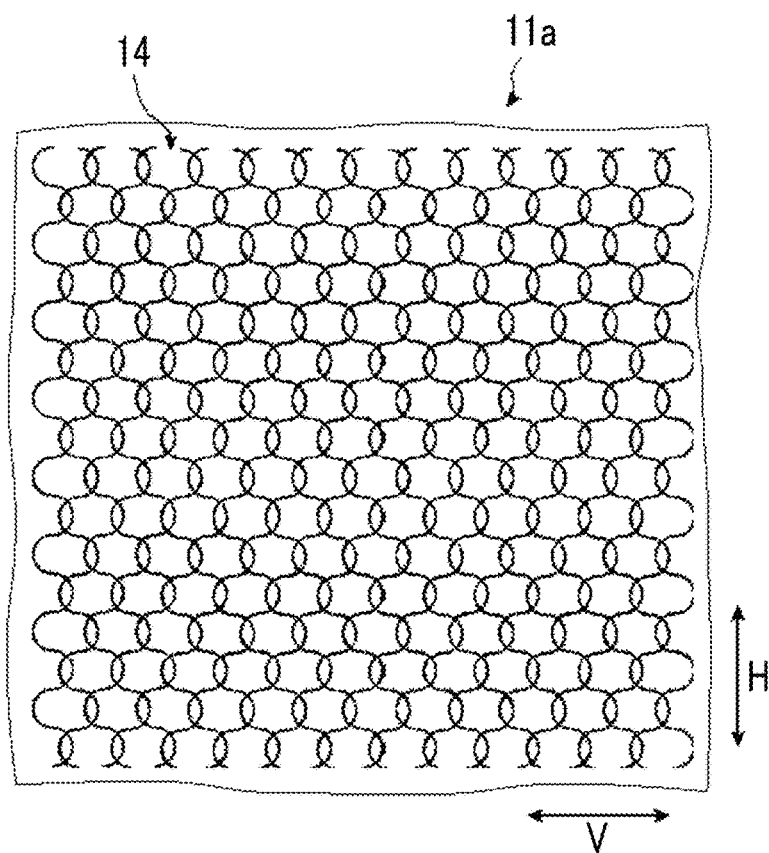
FIG. 9 is a schematic plan view illustrating a configuration of a conductive film according to an embodiment of the invention.
Figure 10:
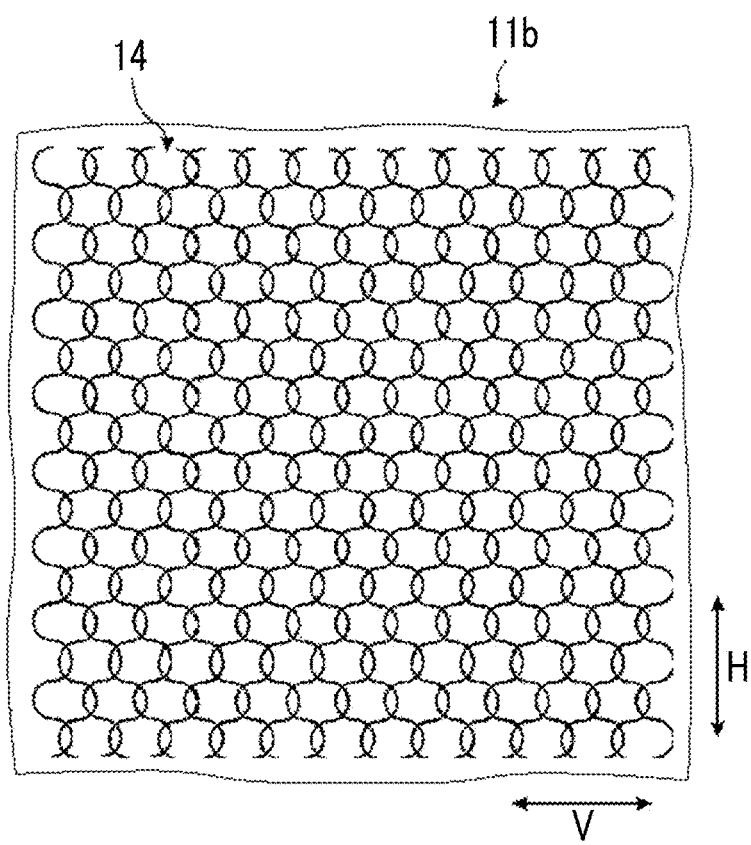
FIG. 10 is a schematic plan view illustrating a configuration of a conductive film according to an embodiment of the invention.
Figure 11:
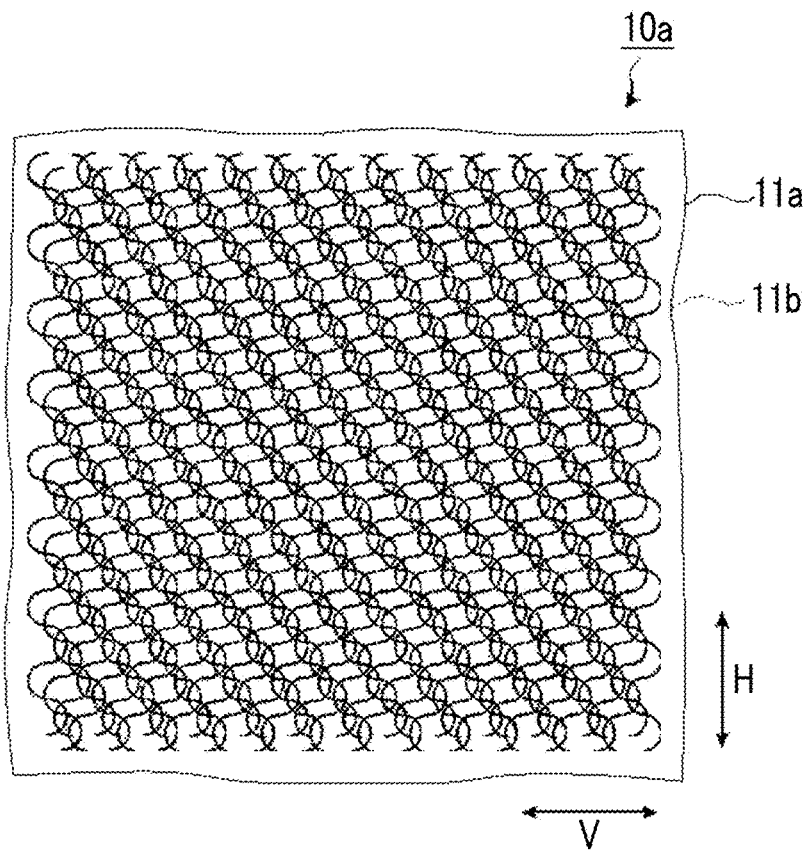
FIG. 11 is a schematic plan view illustrating another example of the configuration of the conductive film according to the embodiment of the invention.

FIG. 9 is a schematic plan view illustrating a configuration of a conductive film according to an embodiment of the invention. FIG. 10 is a schematic plan view illustrating a configuration of a conductive film according to an embodiment of the invention. FIG. 11 is a schematic plan view illustrating another example of the configuration of the conductive film according to the embodiment of the invention.

In this case, a conductive sheet body 11a illustrated in FIG. 9 and a conductive sheet body 11b illustrated in FIG. 10 are prepared. Since the conductive sheet body 11a of FIG. 9 and the conductive sheet body 11b illustrated in FIG. 10 have the same configuration as the conductive sheet body 11 illustrated in FIG. 2, detailed description thereof will be omitted.

The conductive sheet body 11a illustrated in FIG. 9 and the conductive sheet body 11b illustrated in FIG. 10 are made to overlap each other such that arrangement directions of first wavy wires 14a thereof, that is, H-directions thereof coincide with each other, whereby a conductive film 10a illustrated in FIG. 11 is obtained. As in the conductive film 10 illustrated in FIG. 2, the occurrence of the above-described splash can be suppressed in the conductive film 10a.

In a case where the conductive sheet body 11a and the conductive sheet body 11b are laminated as in the conductive film 10a illustrated in FIG. 11, central lines C of the first wavy wires 14a are parallel to each other, and thus the central lines C of the first wavy wires 14a of the conductive sheet bodies 11a and 11b do not intersect. In this case, the lamination angle is 0°.

Figure 12:
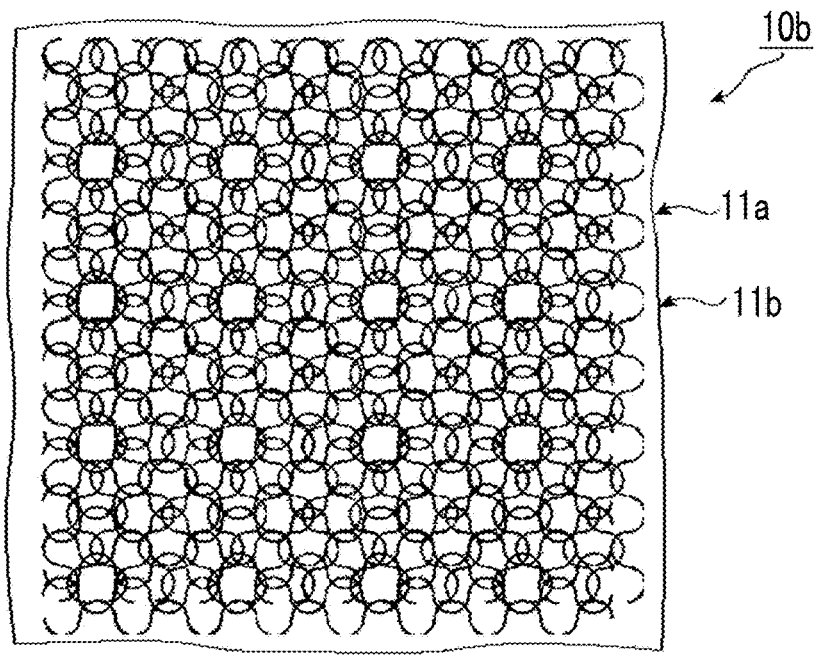
FIG. 12 is a schematic plan view illustrating a further example of the configuration of the conductive film according to the embodiment of the invention.

Regarding directions of the conductive sheet body 11a illustrated in FIG. 9 and the conductive sheet body 11b illustrated in FIG. 10 which overlap each other, the arrangement directions of the first wavy wires 14a of the conductive sheet body 11a illustrated in FIG. 9 and the conductive sheet body 11b illustrated in FIG. 10 preferably coincide with each other from the viewpoint of uniformity in transmittance in the plane, but are not particularly limited. For example, as illustrated in FIG. 12, a conductive film 10b may be made in which the conductive sheet bodies are laminated such that the arrangement direction of the first wavy wires 14a of the conductive sheet body 11a illustrated in FIG. 9 and the arrangement direction of the first wavy wires 14a of the conductive sheet body 11b illustrated in FIG. 10 are shifted to be orthogonal to each other. In a case where the lamination is performed as illustrated in FIG. 12, the angle formed between the central line C of the first wavy wire 14a of the conductive sheet body 11a and the central line C of the first wavy wire 14a of the conductive sheet body 11b is 90°, and thus the lamination angle is 90°.

Figure 13:
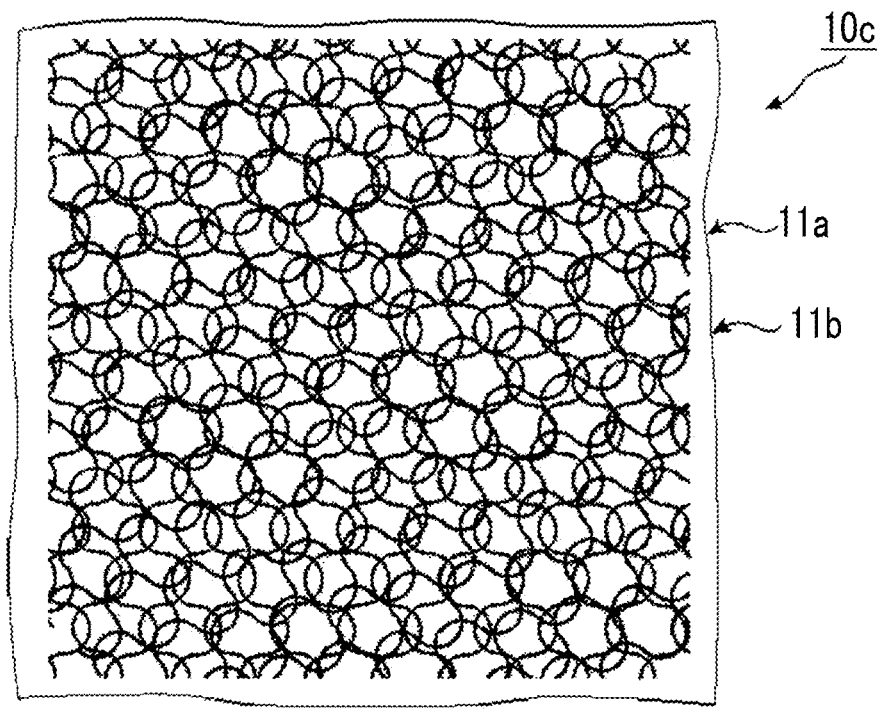
FIG. 13 is a schematic plan view illustrating a still further example of the configuration of the conductive film according to the embodiment of the invention.

In addition, as illustrated in FIG. 13, a conductive film 10c may be made in which the conductive sheet bodies are laminated such that the arrangement direction of the first wavy wires 14a of the conductive sheet body 11a illustrated in FIG. 9 and the arrangement direction of the first wavy wires 14a of the conductive sheet body 11b illustrated in FIG. 10 are shifted to form an angle of 45° therebetween. In a case where the lamination is performed as illustrated in FIG. 13, the angle formed between the central line C of the first wavy wire 14a of the conductive sheet body 11a and the central line C of the first wavy wire 14a of the conductive sheet body 11b is 45°, and thus the lamination angle is 45°.

As in the conductive film 10 illustrated in FIG. 2, the occurrence of the above-described splash can be suppressed in both of the conductive film 10b illustrated in FIG. 12 and the conductive film 10c illustrated in FIG. 13.

An example has been described in which two conductive sheet bodies are laminated. However, since the number of layers may be more than one, the number of conductive sheet bodies is not limited to two and may be three or more.

Next, a method of manufacturing a conductive film 10 will be described. The conductive film 10a illustrated in FIG. 11, the conductive film 10b illustrated in FIG. 12, and the conductive film 10c illustrated in FIG. 13 are different from the conductive film 10 illustrated in FIG. 2, in terms of the fact that these are obtained by lamination and different lamination methods are used, but the configuration of the conductive sheet bodies 11a and 11b is the same as that of the conductive sheet body 11. Thus, a manufacturing method will be described using the conductive film 10 illustrated in FIG. 2 as an example.

The method of manufacturing the conductive film 10 is not particularly limited as long as the pattern wiring 14 can be formed on the substrate 12, and for example, a plating method, a silver salt method, a vapor deposition method, a printing method, or the like can be appropriately used.

A method of forming the pattern wiring 14 using a plating method will be described. For example, the pattern wiring 14 can be formed of a metal plating film which is formed on an electroless plating base substrate layer by performing electroless plating on the base substrate layer. In this case, the film is formed in a manner such that a catalyst ink containing at least fine metal particles is formed in a pattern on a base material, and then the base material is immersed in an electroless plating bath to form a metal plating film. More specifically, a method of manufacturing a metal-coated base material described in JP2014-159620A can be used. In addition, the film is formed in a manner such that a resin composition having a functional group which may interact with at least a metal catalyst precursor is formed in a pattern on a base material, and then a catalyst or a catalyst precursor is applied and the base material is immersed in an electroless plating bath to form a metal plating film. More specifically, a method of manufacturing a metal-coated base material described in JP2012-144761A can be applied.

A method of forming the pattern wiring 14 using a silver salt method will be described. First, using an exposure pattern which is to be the pattern wiring 14, a silver salt emulsion layer containing silver halide is subjected to an exposure treatment, and then a development treatment is performed to form the pattern wiring 14. More specifically, a method of manufacturing a metal thin wire described in JP2015-22397A can be used.

A method of forming the pattern wiring 14 using a vapor deposition method will be described. First, a copper foil layer is formed by vapor deposition, and a copper wiring is formed from the copper foil layer using a photolithographic method to form the pattern wiring 14. As the copper foil layer, electrolytic copper foil can be used other than the vapor deposition copper foil. More specifically, a step of forming a copper wiring described in JP2014-29614A can be used.

A method of forming the pattern wiring 14 using a printing method will be described. First, a conductive paste containing a conductive powder is applied to a substrate in the same pattern as that of the pattern wiring 14, and then a heating treatment is performed to form the pattern wiring 14. The pattern formation using a conductive paste is performed by, for example, an ink jet method or a screen printing method. As the conductive paste, more specifically, a conductive paste described in JP2011-28985A can be used.

Figure 14:
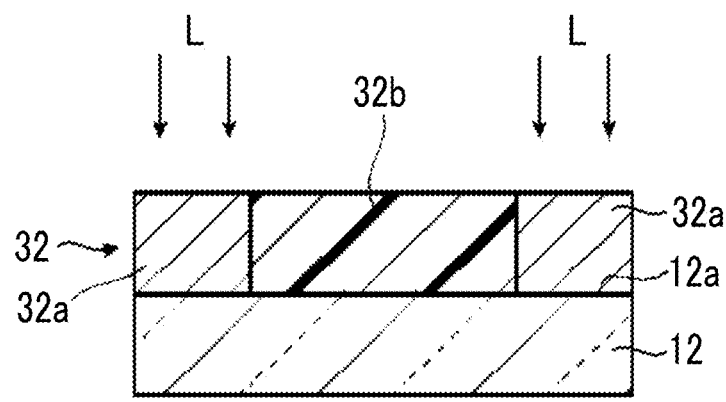
FIG. 14 is a schematic cross-sectional view illustrating a method of manufacturing a conductive film in a step order.
Figure 15:
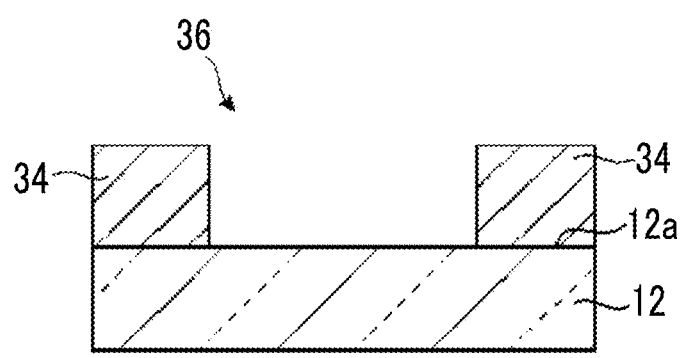
FIG. 15 is a schematic cross-sectional view illustrating the method of manufacturing a conductive film in a step order.
Figure 16:
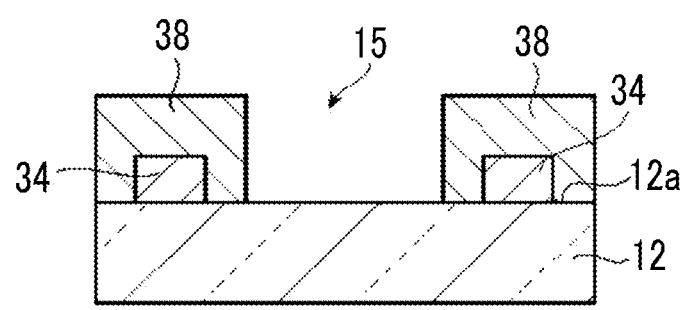
FIG. 16 is a schematic cross-sectional view illustrating the method of manufacturing a conductive film in a step order.

Next, an example of a manufacturing method including forming a conductive thin wire 15 through a plating method will be described in detail. FIGS. 14 to 16 are schematic cross-sectional views illustrating a method of manufacturing a conductive film in a step order.

First, as illustrated in FIG. 14, a photosensitive layer 32 is formed on a front surface 12a of a substrate 12.

The layer is irradiated with exposure light L in a pattern of the pattern wiring 14 to form an exposure region 32a and a non-exposure region 32b in the photosensitive layer 32. The exposure light L is not particularly limited, and may be light transmitting a mask having a pattern formed thereon or laser light.

Next, the non-exposure region of the photosensitive layer (layer for forming a to-be-plated layer) is removed.

By performing this step, the non-exposure region is removed in the layer for forming a to-be-plated layer. More specifically, the non-exposure region 32b is removed from the photosensitive layer 32 illustrated in FIG. 14, and thus as illustrated in FIG. 15, a patterned to-be-plated layer-containing laminate 36 which has a first patterned to-be-plated layer 34 is obtained.

The above-described removing method is not particularly limited, and the most suitable method is appropriately selected according to the compound contained in the layer for forming a to-be-plated layer. General examples thereof include a method of bringing a solvent in which the above-described compound is dissolved into contact with the layer for forming a to-be-plated layer.

More specific examples thereof include a method using an alkaline solution as a developer. In a case where a non-exposure region is removed using an alkaline solution, a method of spraying an alkaline solution in a shower form to a laminate subjected to the irradiation step, a method of immersing a laminate subjected to the irradiation step in an alkaline solution, and a method of applying an alkaline solution to a layer for forming a to-be-plated layer are exemplified, and a method of spraying an alkaline solution in a shower form is preferable. In a case of the method of spraying an alkaline solution in a shower form, the spraying time is preferably about 1 minute to 3 minutes from the viewpoint of productivity, workability, and the like.

The above-described patterned to-be-plated layer-containing laminate 36 illustrated in FIG. 15 is obtained through the above-described procedures.

The patterned to-be-plated layer-containing laminate 36 can be suitably applied for use in the formation of a metal film (conductive film). That is, a plating catalyst or a precursor thereof is applied to the patterned to-be-plated layer in the patterned to-be-plated layer-containing laminate 36 to perform a plating treatment, and thus a metal layer 38 can be formed on the patterned to-be-plated layer. That is, a pattern of the metal layer can be controlled by controlling the shape of the patterned to-be-plated layer. In addition, using such a patterned to-be-plated layer, adhesiveness of the metal layer with respect to the substrate is improved.

Hereinafter, a step of forming the above-described metal layer (metal layer forming step) will be described in detail.

<Metal Layer Forming Step>

This step is a step of applying a plating catalyst or a precursor thereof to the patterned to-be-plated layer in the patterned to-be-plated layer-containing laminate to perform a plating treatment on the patterned to-be-plated layer to which a plating catalyst or a precursor thereof is applied, thereby forming a metal layer on the patterned to-be-plated layer. More specifically, through the above-described step, as illustrated in FIG. 16, the metal layer 38 is formed on the first patterned to-be-plated layer 34. A material in which the metal layer 38 is formed on the first patterned to-be-plated layer 34 is the conductive thin wire 15.

FIG. 16 illustrates an aspect in which the metal layer 38 is disposed on a surface of the first patterned to-be-plated layer 34 other than a contact surface between the first patterned to-be-plated layer 34 and the substrate 12. That is, the metal layer is disposed so as to cover a surface of the first patterned to-be-plated layer 34 other than the contact surface between the first patterned to-be-plated layer and the substrate. However, the invention is not limited to this aspect, and an aspect in which the metal layer 38 is disposed only on an upper surface of the first patterned to-be-plated layer 34 may be employed.

A material in which the metal layer 38 is disposed on a surface of the first patterned to-be-plated layer 34 other than a contact surface between the first patterned to-be-plated layer 34 and the substrate 12 is also the conductive thin wire 15.

Hereinafter, a step of applying a plating catalyst or a precursor thereof to the patterned to-be-plated layer (Step X) and a step of performing a plating treatment on the patterned to-be-plated layer to which a plating catalyst or a precursor thereof is applied (Step Y) will be separately described.

(Step X: Plating Catalyst Applying Step)

In this step, first, a plating catalyst or a precursor thereof is applied to the patterned to-be-plated layer. An interactive group derived from the above-described compound adheres to (adsorbs) the applied plating catalyst or the precursor thereof in accordance with a function of the interactive group. More specifically, a plating catalyst or a precursor thereof is applied in the patterned to-be-plated layer and to a surface of the patterned to-be-plated layer.

The plating catalyst or the precursor thereof functions as a catalyst or an electrode of the plating treatment. Therefore, the type of the plating catalyst or the precursor thereof to be used is appropriately determined by the type of the plating treatment.

The plating catalyst or the precursor thereof to be used is preferably an electroless plating catalyst or a precursor thereof. Hereinafter, the electroless plating catalyst or the catalyst thereof will be mainly described in detail.

In this step, as an electroless plating catalyst to be used, any material can be used as long as it serves as active cores during electroless plating. Specific examples thereof include metals having a catalytic capacity for an autocatalytic reduction reaction (known as metals which have an ionization tendency lower than that of Ni and can be subjected to electroless plating). Specific examples thereof include Pd, Ag, Cu, Ni, Pt, Au, and Co. Among these, Ag, Pd, Pt, and Cu are particularly preferable in view of level of the catalytic capacity.

As the electroless plating catalyst, a metal colloid may be used.

In this step, as an electroless plating catalyst precursor to be used, any material can be used without particular limitations as long as it may serve as an electroless plating catalyst through a chemical reaction. Metal ions of the metals exemplified as the above-described electroless plating catalyst are mainly used.

As a method of applying a plating catalyst or a precursor thereof to the patterned to-be-plated layer, for example, a solution may be prepared by dispersing or dissolving a plating catalyst or a precursor thereof in an appropriate solvent, and the solution may be applied to the patterned to-be-plated layer. Otherwise, the laminate having the patterned to-be-plated layer formed therein may be immersed in the solution.

(Step Y: Plating Treatment Step)

Next, a plating treatment is performed on the patterned to-be-plated layer to which the plating catalyst or the precursor thereof is applied.

The method for the plating treatment is not particularly limited, and examples thereof include an electroless plating treatment and an electrolytic plating treatment (electroplating treatment). In this step, an electroless plating treatment may be independently performed. Otherwise, an electroless plating treatment may be performed, and then an electrolytic plating treatment may be further performed. Known methods are employed as the electroless plating treatment and the electrolytic plating treatment.

Through the above-described step, a metal layer (plating layer) can be formed on the patterned to-be-plated layer.

Next, a wiring according to an embodiment of the invention will be described.

Using the conductive film according to the invention, a wiring can be formed by appropriately cutting the arc arrangement of the pattern wiring 14. A wiring can be formed using the above-described conductive film 10. Examples of the pattern of the wiring formation are illustrated in the following FIGS. 17 to 21. However, the wiring pattern according to the invention is not limited thereto. Hereinafter, the wiring will be described in detail.

Figure 17:
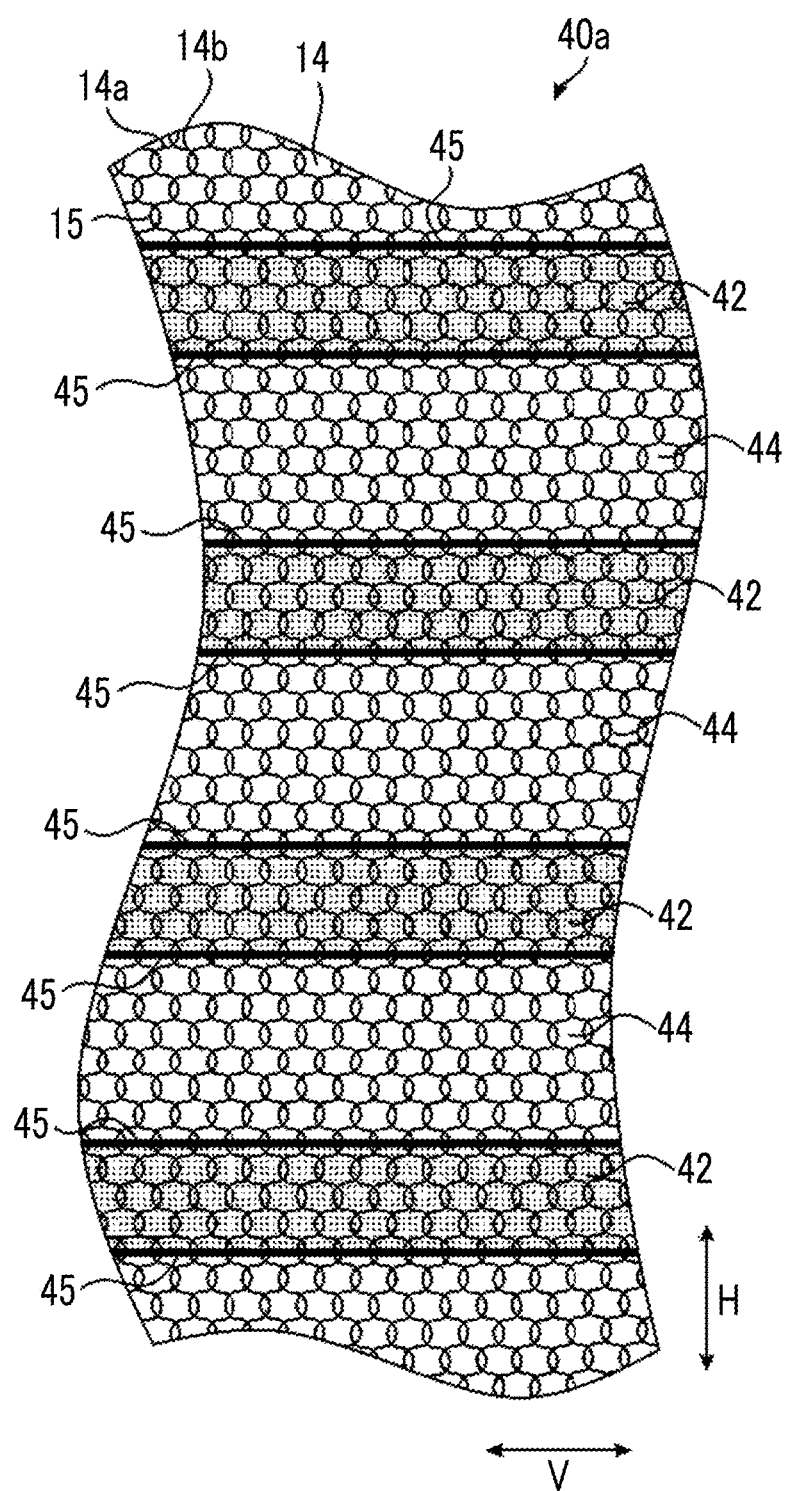
FIG. 17 is a schematic diagram illustrating a first example of a wiring according to an embodiment of the invention.
Figure 18:
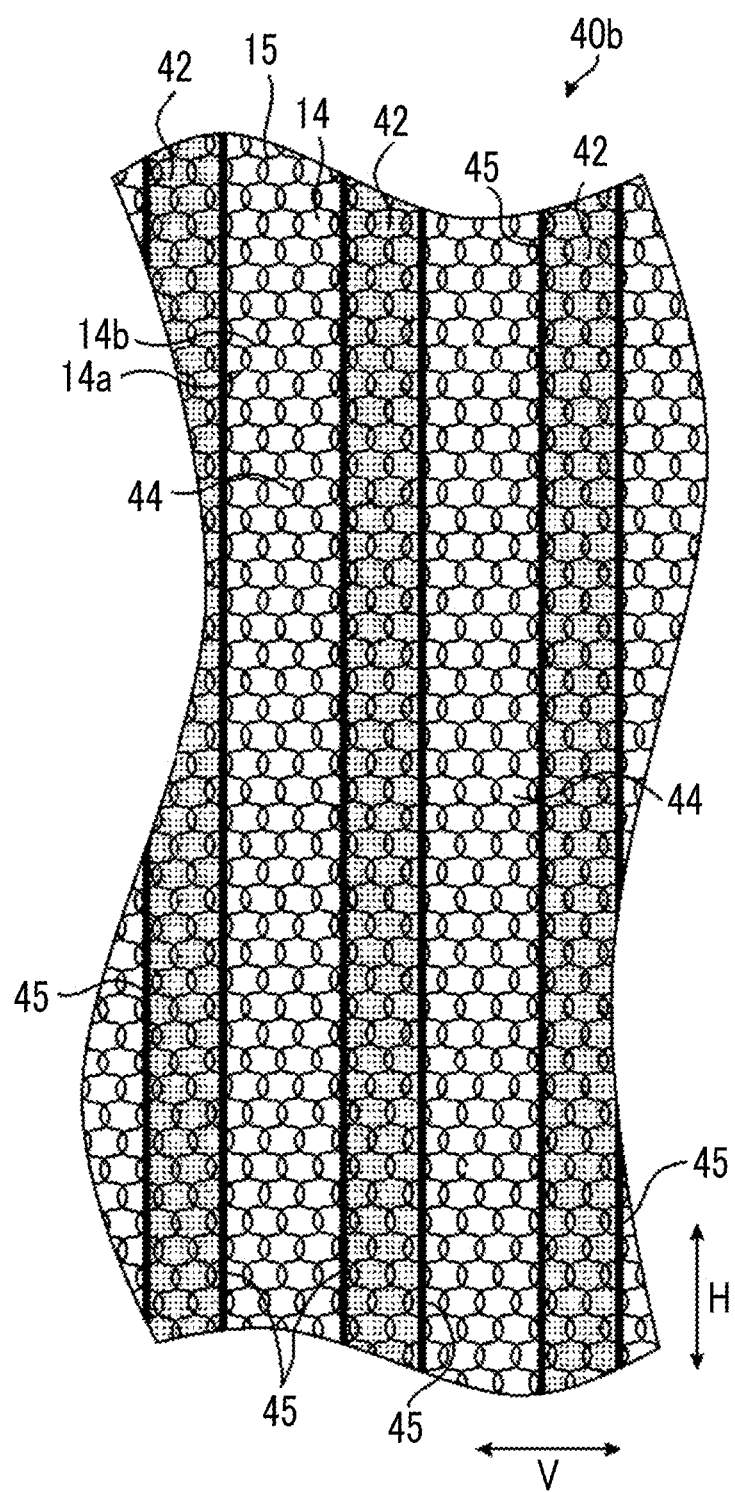
FIG. 18 is a schematic diagram illustrating a second example of the wiring according to the embodiment of the invention.
Figure 19:
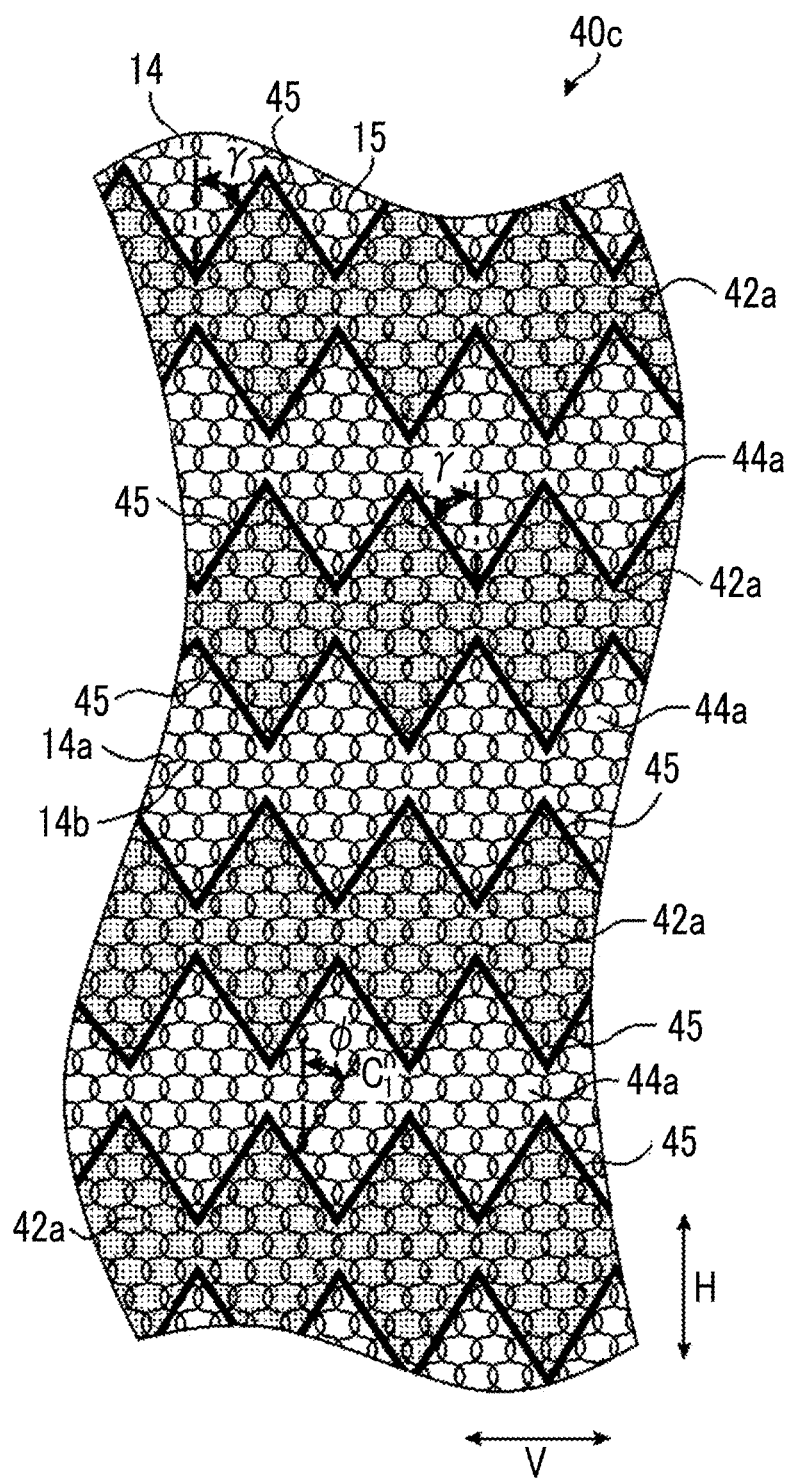
FIG. 19 is a schematic diagram illustrating a third example of the wiring according to the embodiment of the invention.
Figure 20:
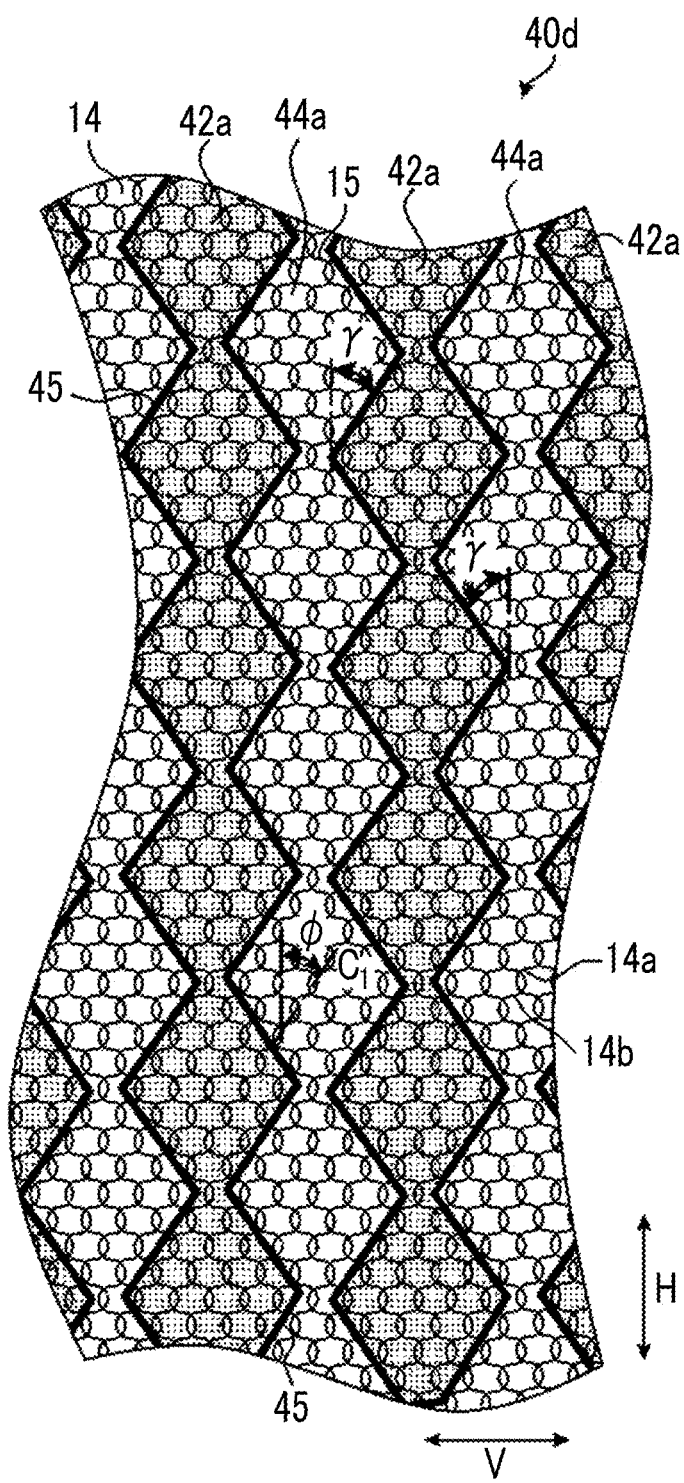
FIG. 20 is a schematic diagram illustrating a fourth example of the wiring according to the embodiment of the invention.
Figure 21:
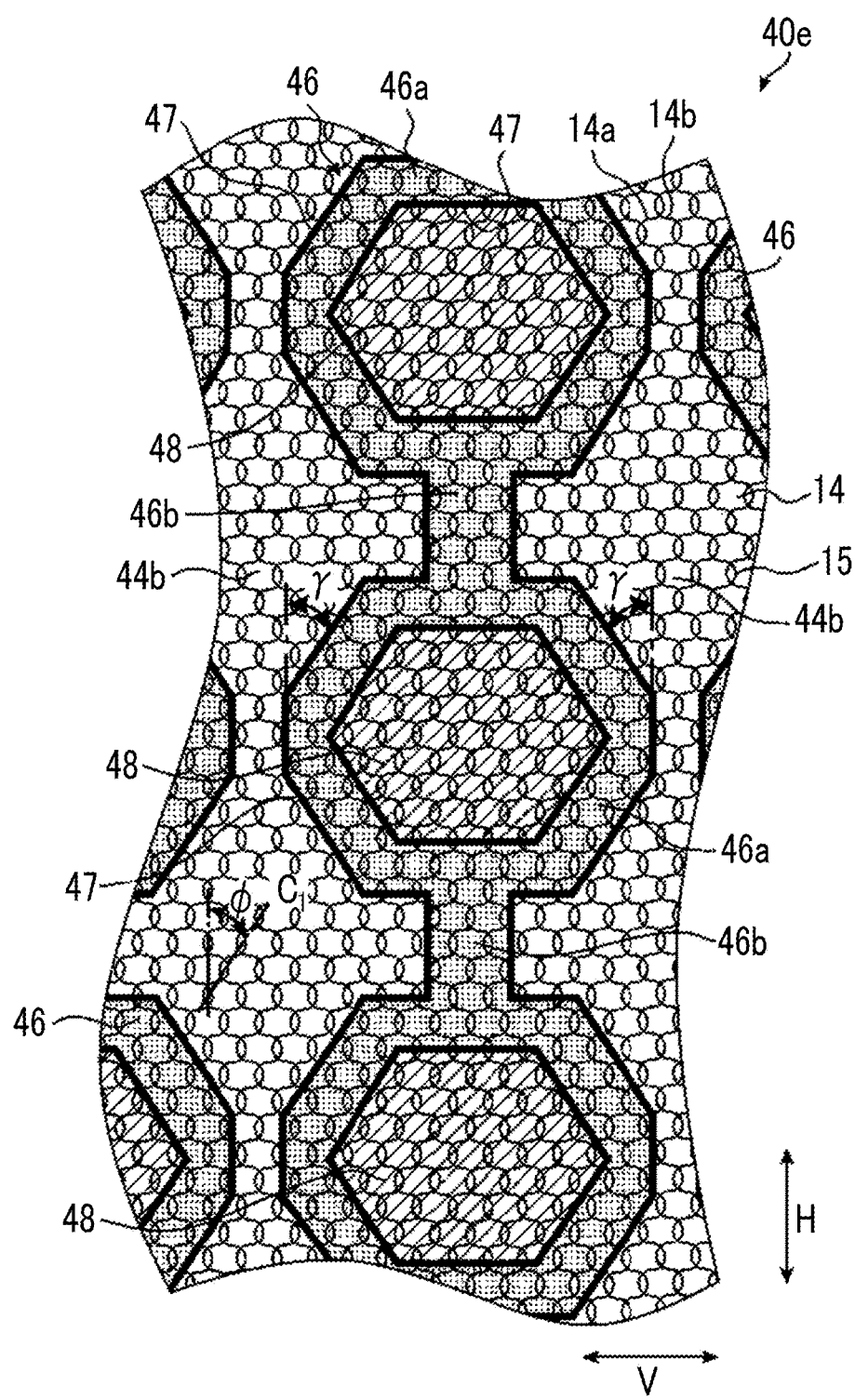
FIG. 21 is a schematic diagram illustrating a fifth example of the wiring according to the embodiment of the invention.

FIG. 17 is a schematic diagram illustrating a first example of the wiring according to the embodiment of the invention.
FIG. 18 is a schematic diagram illustrating a second example of the wiring according to the embodiment of the invention.
FIG. 19 is a schematic diagram illustrating a third example of the wiring according to the embodiment of the invention.
FIG. 20 is a schematic diagram illustrating a fourth example of the wiring according to the embodiment of the invention.
FIG. 21 is a schematic diagram illustrating a fifth example of the wiring according to the embodiment of the invention.
In FIGS. 17 to 21, the same constituent members as those of the above-described conductive film 10 illustrated in FIGS. 2 and 3 will be denoted by the same references and detailed description thereof will be omitted. A V-direction and an H-direction in FIGS. 17 to 21 correspond to the V-direction and the H-direction in FIG. 2. In addition, in FIGS. 17 to 21, outlines 45 and 47 shown by thick lines and intersecting parts in first wavy wires 14a and second wavy wires 14b of pattern wirings 14 are cut. Here, the references 42, 42a, 42b, 46, 46a, and 46b indicate active wires. The regions represented by the references 44, 44a, 44b, and 48 are not active wires, and may be or may not be eliminated. In a case where the regions are not eliminated, these may be finely divided. It is preferable that the regions are not eliminated and formed as dummy wirings from the viewpoint of transmittance.

In a wiring 40a illustrated in FIG. 17, the above-described conductive film 10 (see FIG. 2) is cut in the V-direction, that is, a direction perpendicular to the arrangement direction of arcs to form a linear wiring. A first wavy wire 14a and a second wavy wire 14b of a pattern wiring 14 are cut along an outline 45 to form an active wire 42. In the wiring 40a, an active wire 42 is a conduction path, and a region 44 between active wires 42 is a dummy wiring.

In a wiring 40b illustrated in FIG. 18, the above-described conductive film 10 (see FIG. 2) is cut in the H-direction, that is, a direction parallel to the arrangement direction of arcs to form a linear wiring. Also in this case, a first wavy wire 14a and a second wavy wire 14b of a pattern wiring 14 are cut along an outline 45 to form an active wire 42. In the wiring 40b, an active wire 42 is a conduction path, and a region 44 between active wires 42 is a dummy wiring.

Here, a case in which a first wavy wire 14a and a second wavy wire 14b of a pattern wiring 14 are obliquely cut will be described.

In a case of oblique cutting, the cutting angle is defined by an angle γ formed with respect to the arrangement direction.

The cutting angle γ is required to coincide with an arrangement angle φ of overlap regions 22. That is, the cutting angle is required to satisfy the condition of $|\gamma|=|\phi|=\tan^{-1}(P/Da)$.

In a case where the first wavy wire 14a and the second wavy wire 14b of the pattern wiring 14 are cut in a direction orthogonal to the arrangement direction of arcs and in a direction parallel to the arrangement direction of arcs, the cutting is not subjected to the limitation of the ratio P/Da. Therefore, the condition in the cutting is applied in a case where the angle γ is in a range of greater than 0° to less than 90° in terms of an absolute value.

By changing the ratio P/Da as described above, the arrangement angle φ of the overlap regions 22 can be changed, and the cutting angle γ can be changed. In addition, in a case where the cutting angle γ is previously determined, the ratio P/Da may be set in accordance with the angle γ.

Here, the cut parts are not necessarily required to be aligned in a straight line at the angle γ, and active wires which are formed by cutting may be cut at the angle γ. It is preferable that the cut parts are not in a straight line, but deviated from the straight line from the viewpoint of visibility.

As described above, in a case where the first wavy wire 14a and the second wavy wire 14b of the pattern wiring 14 are cut in a direction orthogonal to the arrangement direction of arcs and in a direction parallel to the arrangement direction of arcs, the cutting is not subjected to the limitation of the ratio P/Da. Therefore, regarding the wiring 40a illustrated in FIG. 17 and the wiring 40b illustrated in FIG. 18 which have been described above, the cutting is not subjected to the limitation of the ratio P/Da.

In a wiring 40c illustrated in FIG. 19, the above-described conductive film 10 (see FIG. 2) is cut to cut a first wavy wire 14a and a second wavy wire 14b of a pattern wiring 14 along two outlines 45 to thus form an active wire 42a. In the wiring 40c, an active wire 42a is a conduction path, and a region 44a between active wires 42a is a dummy wiring. In addition, in the wiring 40c, the outline 45 has a triangular waveform shape proceeding in the V-direction, that is, a direction perpendicular to the arrangement direction of arcs. In the wiring 40c, polygonal regions having a diamond shape are formed to be connected in a direction perpendicular to the arrangement direction of arcs.

An angle γ of an oblique side of the active wire 42a is made to coincide with an arrangement angle φ of overlap regions 22 from the above description to perform the cutting obliquely with respect to the arrangement direction of arcs and form the active wire.

In a wiring 40d illustrated in FIG. 20, the above-described conductive film 10 (see FIG. 2) is cut to cut a first wavy wire 14a and a second wavy wire 14b of a pattern wiring 14 along two outlines 45 to thus form an active wire 42a. In the wiring 40d, an active wire 42a is a conduction path, and a region 44a between active wires 42a is a dummy wiring. In addition, in the wiring 40d, the outline 45 has a triangular waveform shape proceeding in the H-direction, that is, a direction parallel to the arrangement direction of arcs. In the wiring 40d, polygonal regions having a diamond shape are formed to be connected in a direction parallel to the arrangement direction of arcs.

An angle γ of an oblique side of the active wire 42a is made to coincide with an arrangement angle φ of overlap regions 22 from the above description to perform the cutting obliquely with respect to the arrangement direction of arcs and form the active wire.

In a wiring 40e illustrated in FIG. 21, a polygonal wiring is formed parallel to the arrangement direction of arcs by combining a direction parallel to, a direction perpendicular to, and a direction oblique to the arrangement direction of arcs, and a dummy wiring is formed in the polygon.

In the wiring 40e illustrated in FIG. 21, a first wavy wire 14a and a second wavy wire 14b of a pattern wiring 14 are cut along an outline 47 to form an active wire 46. The active wire 46 has polygonal regions 46a and linear regions 46b connecting the polygonal regions 46a. A region 48 surrounded by the outline 47 in the polygonal region 46a is a dummy wiring. A region 44b where no active wire 46 is formed is also a dummy wiring.

In the wiring 40e, the active wire 46 is used as a conductor to energize the polygonal region 46a and the linear region 46b. The region 48 in the polygonal region 46a is energized since it is separated from the polygonal region 46a due to the cutting of the first wavy wire 14a and the second wavy wire 14b along the outline 47.

An angle γ of an oblique side on the outer side of the polygonal region 46a and an angle γ of an oblique surface on the inner side are made to coincide with an arrangement angle φ of overlap regions 22 from the above description to perform the cutting obliquely with respect to the arrangement direction of arcs and form the active wire.

A wiring can be formed using the conductive film according to the invention as described above. However, the wiring can also be used for, for example, antennas and touch panel sensors other than conductive wirings carrying electricity. In a wiring using the conductive film according to the invention, the occurrence of the above-described splash can be suppressed as in the above-described conductive film 10.

Next, a touch panel sensor according to an embodiment of the invention will be described.

Figure 22:
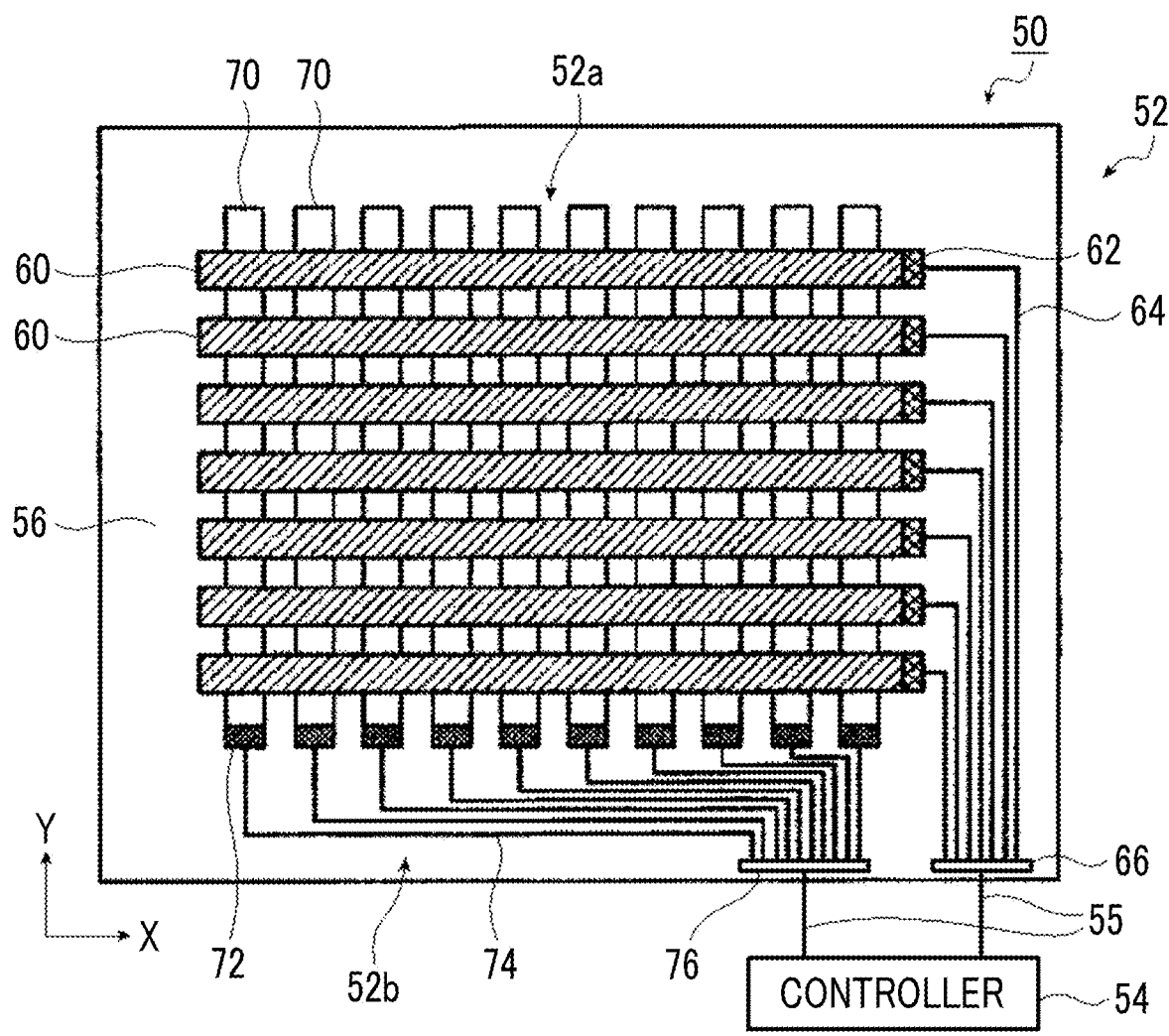
FIG. 22 is a schematic diagram illustrating a touch panel sensor according to an embodiment of the invention.

FIG. 22 is a schematic diagram illustrating a touch panel sensor according to an embodiment of the invention. FIGS. 23 to 25 and 26 to 28 are schematic cross-sectional views of the touch panel sensor according to the embodiment of the invention in FIG. 22.

In touch panel sensors 50 illustrated in FIGS. 22 to 28, the same constituent members as those of the above-described conductive film 10 illustrated in FIGS. 2, 3, and 8 will be denoted by the same references and detailed description thereof will be omitted.

A touch panel sensor 50 illustrated in FIG. 22 is used together with a display device such as a liquid crystal display device and is provided on the display device. Therefore, the touch panel sensor is transparent in order to recognize an image which is displayed on the display device. The display device is not particularly limited as long as it can display a predetermined image including a moving image on a screen. For example, an organic electro luminescence (EL) display device or electronic paper can be used other than the above-described liquid crystal display device.

The touch panel sensor 50 has a touch panel part 52 and a controller 54, and the touch panel part 52 and the controller 54 are connected by, for example, a connecting wiring 55. Regarding the contact to the touch panel part 52 of the touch panel sensor 50, a position where the capacitance is changed by the contact of a finger or the like in the touch panel sensor 50 is detected by the controller 54. The controller 54 is an external device of the touch panel sensor 50 and is composed of, for example, a known device which is used for position detection in a capacitance type touch panel.

An X-direction and a Y-direction illustrated in FIG. 22 are orthogonal to each other. In the touch panel part 52 of the touch panel sensor 50, a plurality of first conductive layers 60 extending in the X-direction are disposed with intervals therebetween in the Y-direction. In addition, a plurality of second conductive layers 70 extending in the Y-direction are disposed with intervals therebetween in the X-direction.

Each first conductive layer 60 is electrically connected to a first terminal part 62 at one end thereof. Each first terminal part 62 is electrically connected to a first wiring 64. The first wirings 64 are gathered in a connector part 66 and connected to the controller 54 by the connecting wiring 55.

Each second conductive layer 70 is electrically connected to a second terminal part 72 at one end thereof. Each second terminal part 72 is electrically connected to a second conductive wiring 74. The second wirings 74 are gathered in a connector part 76 and connected to the controller 54 by the connecting wiring 55. The terminal part may be disposed at only one end or both ends of the conductive layer to be electrically connected to the wiring and may be gathered in each connector part.

Both of the first conductive layer 60 and the second conductive layer 70 function as a detecting electrode which detects touch in the touch panel sensor 50. A sensor part 52a which detects touch by the first conductive layer 60 and the second conductive layer 70 is configured. The first terminal parts 62, the first wiring 64, the connector part 66, the second terminal parts 72, the second wiring 74, and the connector part 76 may be collectively called a peripheral wiring part 52b.

The first conductive layer 60, the first terminal part 62, the first wiring 64, and the connector part 66 have the same configurations as the second conductive layer 70, the second terminal part 72, the second wiring 74, and the connector part 76, respectively.

Figure 23:
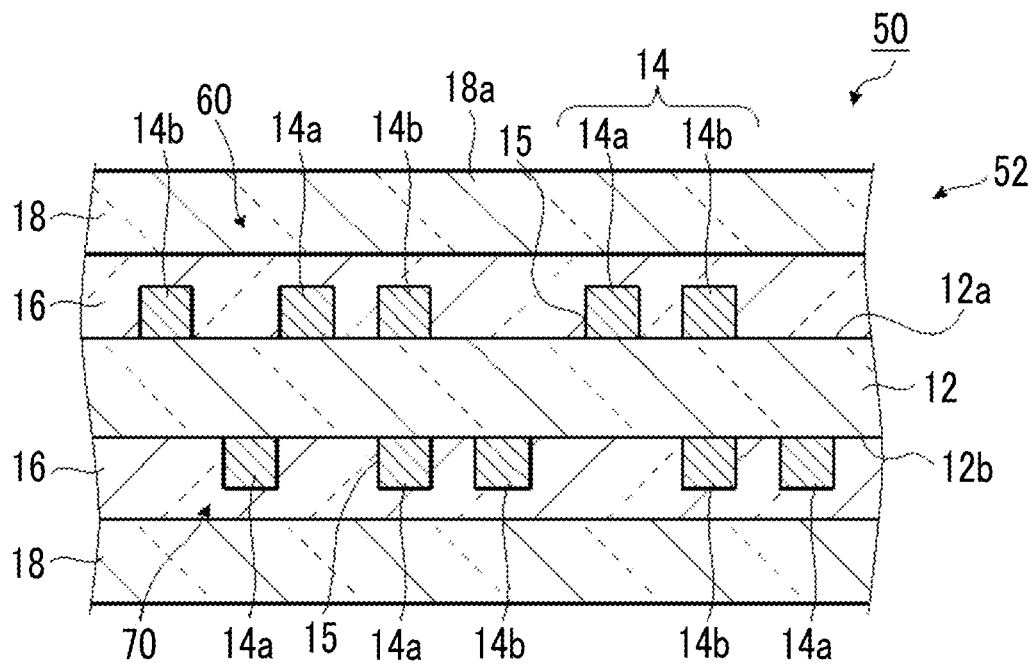
FIG. 23 is a schematic cross-sectional view of the touch panel sensor according to the embodiment of the invention in FIG. 22.

As illustrated in FIG. 23, in a touch panel sensor 50, a first conductive layer 60 is formed on a front surface 12a of a substrate 12, and a second conductive layer 70 is formed on a rear surface 12b of the substrate 12. A protective layer 18 is provided on the first conductive layer 60 with an adhesive layer 16 interposed therebetween, and a protective layer 18 is provided on the second conductive layer 70 with an adhesive layer 16 interposed therebetween.

Although not illustrated in FIG. 23, a first terminal part 62, a first wiring 64, and a connector part 66 are formed on the front surface 12a of the substrate 12 on which the first conductive layer 60 is formed. The first terminal part 62, the first wiring 64, and the connector part 66 can also be formed using the above-described conductive film 10 as in the case of the first conductive layer 60.

Although not illustrated in FIG. 23, a second terminal part 72, a second wiring 74, and a connector part 76 are formed on the rear surface 12b of the substrate 12 on which the second conductive layer 70 is formed. The second terminal part 72, the second wiring 74, and the connector part 76 can also be formed using the above-described conductive film 10 as in the case of the second conductive layer 70.

By forming the first conductive layer 60 on the front surface 12a of one substrate 12 and forming the second conductive layer 70 on the rear surface 12b, a deviation in the positional relationship between the first conductive layer 60 and the second conductive layer 70 can be reduced even in a case where the substrate 12 contracts.

Both of the first conductive layer 60 and the second conductive layer 70 are schematically shown like a rod, but as the configuration thereof, the configurations of the wirings 40a to 40c illustrated in FIGS. 17 to 19 can be used. Both of the first conductive layer 60 and the second conductive layer 70 are composed of the above-described pattern wiring 14. A surface 18a of the protective layer 18 serves as a surface of the touch panel sensor 50.

It is preferable that the substrate 12 is a transparent substrate in the touch panel sensor 50. In a case where the touch panel sensor 50 has flexibility, it is preferable that the touch panel sensor is made of polyolefins such as polyethylene terephthalate (PET), cycloolefin polymer (COP), and cycloolefin copolymer (COC).

The configuration of the touch panel sensor 50 is not limited to the configuration illustrated in FIG. 23, and for example, one conductive layer may be provided on one substrate 12. As in touch panel sensors 50 illustrated in FIGS. 24 and 25, front surfaces 12a of substrates 12 having a pattern wiring 14 formed therein may be stuck to be opposed to each other. As in touch panel sensors 50 illustrated in FIGS. 26 and 27, the directions of front surfaces 12a of substrates 12 having a pattern wiring 14 formed therein may be matched to stick the front surface 12a of the substrate 12 to a rear surface 12b having no pattern wiring 14 formed therein. As in a touch panel sensor 50 illustrated in FIG. 28, rear surfaces 12b of substrates 12 having no pattern wiring 14 formed therein may be stuck to be opposed to each other.

Figure 24:
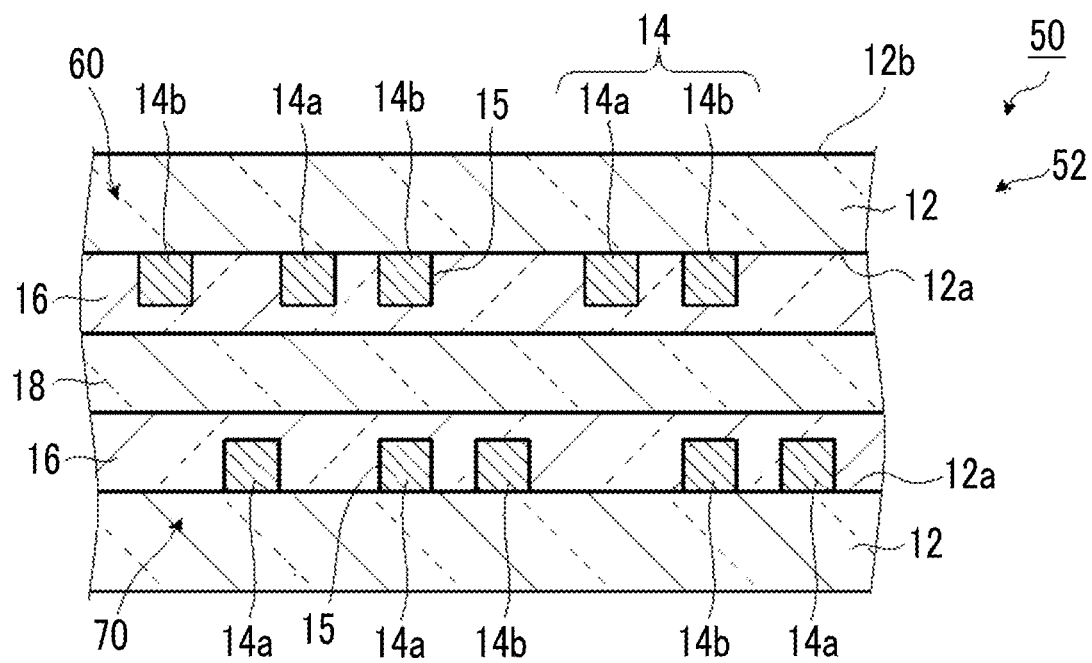
FIG. 24 is a schematic cross-sectional view of the touch panel sensor according to the embodiment of the invention in FIG. 22.
Figure 25:
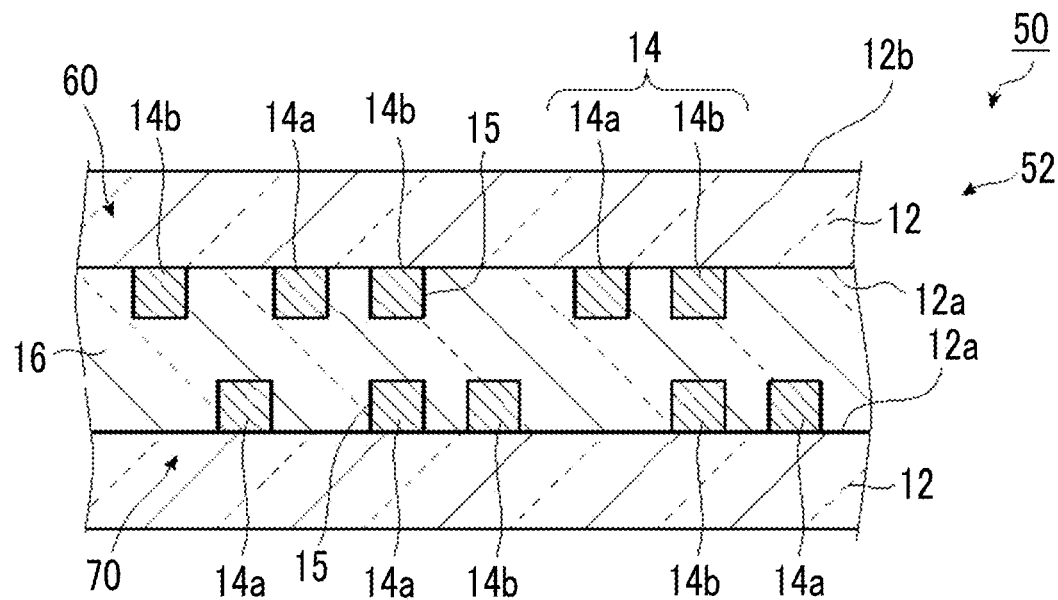
FIG. 25 is a schematic cross-sectional view of the touch panel sensor according to the embodiment of the invention in FIG. 22.
Figure 26:
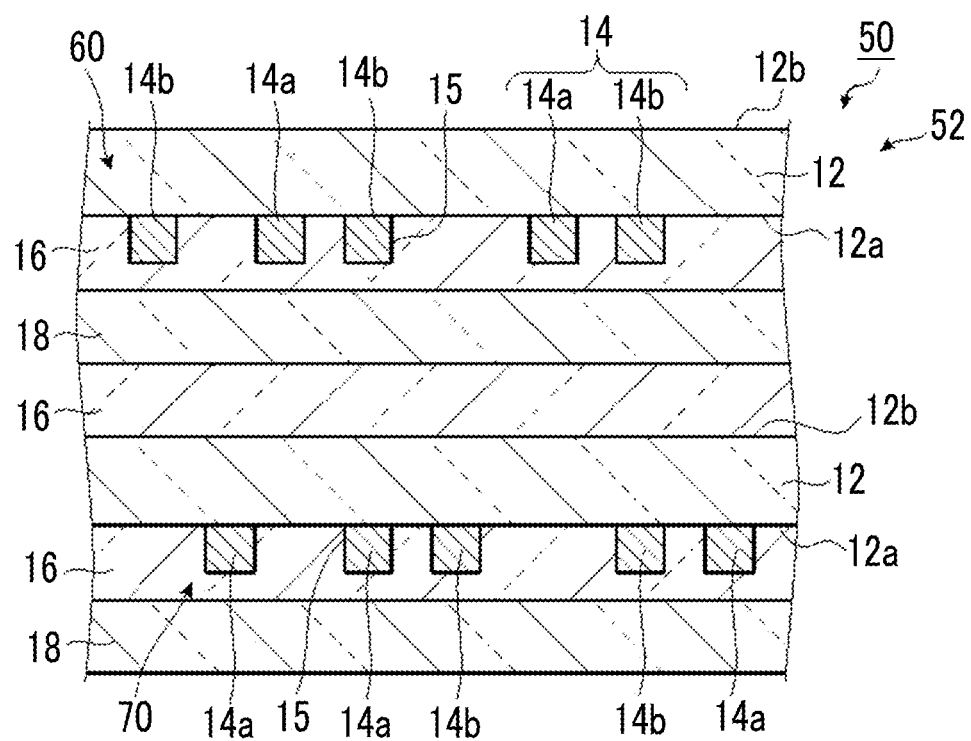
FIG. 26 is a schematic cross-sectional view of the touch panel sensor according to the embodiment of the invention in FIG. 22.
Figure 27:
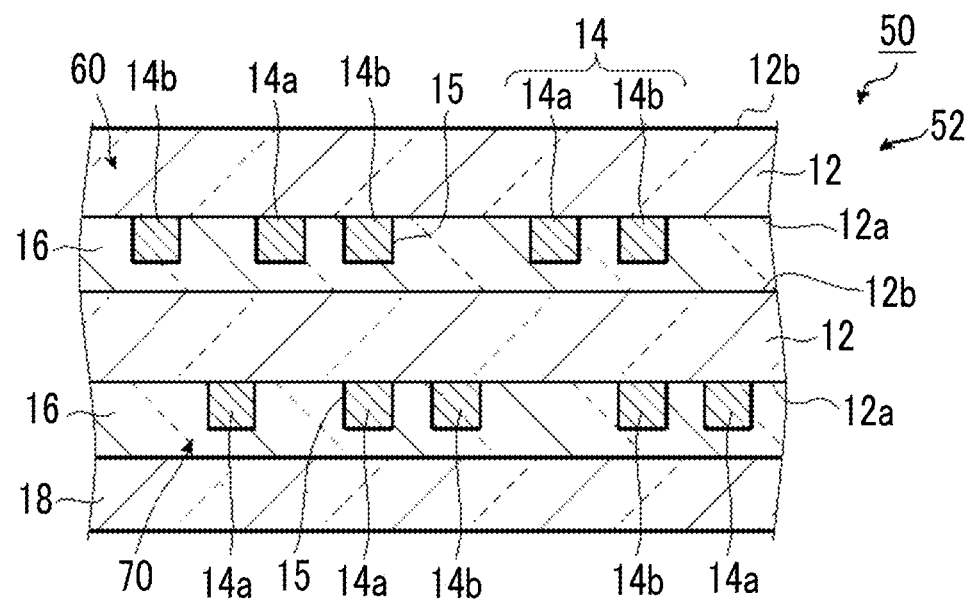
FIG. 27 is a schematic cross-sectional view of the touch panel sensor according to the embodiment of the invention in FIG. 22.
Figure 28:
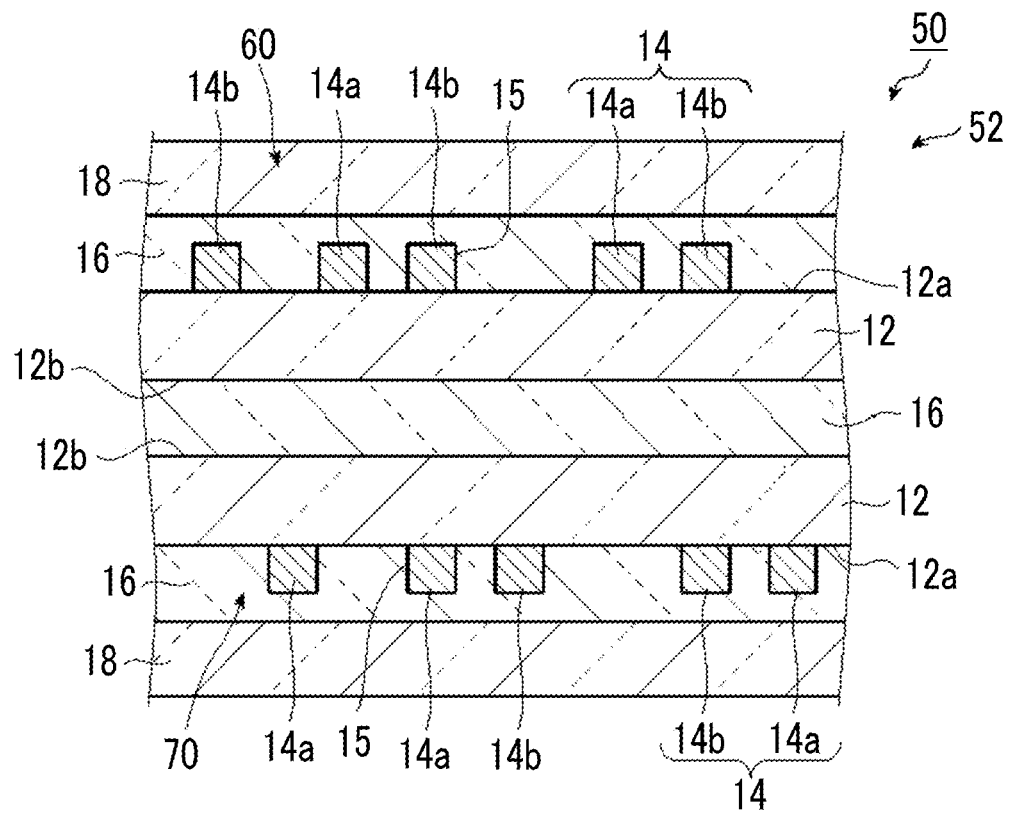
FIG. 28 is a schematic cross-sectional view of the touch panel sensor according to the embodiment of the invention in FIG. 22.

In a case where the sticking is performed, a protective layer 18 may be provided between two substrates 12 as in the touch panel sensors 50 illustrated in FIGS. 24 and 26, or a protective layer 18 may be provided between two substrates 12 as in the touch panel sensors 50 illustrated in FIGS. 25, 27, and 28.

Using the above-described conductive film 10 also in the touch panel sensor 50, the touch panel sensor 50 can be allowed to function as a touch panel sensor and the occurrence of the above-described splash can be suppressed.

The touch panel sensor 50 has a configuration in which the above-described conductive sheet body 11 is formed on a front surface 12a of one substrate 12 and the above-described conductive sheet body 11 is formed on a rear surface 12b, and the configuration is the same as a configuration in which two conductive films 10 overlap each other. Regarding methods of overlapping the conductive sheet bodies 11, it is preferable that arrangement directions of two conductive sheet bodies 11, that is, an H-direction and a V-direction coincide with each other (see FIG. 11) as described above. In addition, as illustrated in FIGS. 12 and 13, the H-direction and the V-direction may not coincide with each other and the angle may be changed to laminate the conductive sheet bodies 11. Any lamination method can be used to allow the touch panel sensor 50 to function as a touch panel sensor and to suppress the occurrence of the above-described splash.

The basic configuration of the invention is as described above. Hereinafter, the conductive film, the wiring, and the touch panel sensor according to the invention will be described in detail, but the invention is not limited to the above-described embodiments, and it is obvious that various improvements or changes may be made without departing from the gist of the invention.

Example 1

Hereinafter, the invention will be described in more detail with reference to examples of the invention. Materials, amounts, ratios, process details, process orders, and the like provided in the following examples can be appropriately changed without departing from the gist of the invention. Accordingly, the ranges of the invention should not be restrictively interpreted by the following specific examples.

In this example, conductive films of Examples 1 to 6 and Comparative Examples 1 and 2 were produced to evaluate splash. The splash was evaluated as follows.

(Splash Evaluation)

The conductive films of Examples 1 to 6 and Comparative Examples 1 and 2 were irradiated with light of a white light emitting diode with no limitation to observe the presence or absence of strip-like reflected light. The presence or absence of the strip-like reflected light was evaluated with evaluation points of the following standards.

Ten subjects performed the evaluation, and the evaluation was performed with the number of subjects who could visually recognize strip-like reflected light among the ten subjects.

Evaluation Standards

"A": The number of subjects who could visually recognize strip-like reflected light (splash) is zero (nobody could visually recognize the splash).

"B": The number of subjects who could visually recognize strip-like reflected light (splash) is 1 to 4.

"C": The number of subjects who could visually recognize strip-like reflected light (splash) is 5 to 9.

"D": The number of subjects who could visually recognize strip-like reflected light (splash) is 10.

Hereinafter, Examples 1 to 6 and Comparative Examples 1 and 2 will be described.

Example 1

<Preparation of Composition 1>
Isopropanol (IPA) 94.9 parts by mass
Polyacrylic Acid 3 parts by mass
Methylenebisacrylamide (MBA) 2 parts by mass
IRGACURE (registered trademark) 127 (manufactured by BASF SE) 0.1 parts by mass A liquid was prepared to have the above composition, and thus a composition 1 was obtained.

<Production of Laminate>

A4300 (trade name, manufactured by TOYOBO CO., LTD.) having a thickness of 100 μm was used as a substrate and the composition 1 was applied to a surface of the substrate such that a dried film had a thickness of 0.5 μm. Hereinafter, A4300 (trade name, manufactured by TOYOBO CO., LTD.) may be simply called a PET film.

A mask having a pattern which is to be the pattern wiring 14 illustrated in FIG. 2 was disposed on the dried film of the composition 1, and the dried film was exposed using a UV (ultraviolet) lamp Deep UV Lamp (manufactured by Ushio Inc.) through the mask. Development was performed by immersing for 5 minutes in a 1 mass %-sodium carbonate aqueous solution at 40° C. to obtain a substrate including a patterned to-be-plated layer. The obtained substrate was immersed in a Pd catalyst-imparting solution MAT-2 (manufactured by C. Uyemura & Co., Ltd.) obtained by diluting only MAT-2A to 5 times at room temperature for 5 minutes, and washed twice with pure water. Next, the substrate was immersed in a reducing agent MAB (manufactured by C. Uyemura & Co., Ltd.) at 36° C. for 5 minutes and washed twice with pure water. Then, the substrate was immersed in an electroless plating solution THRU-CUP PEA (manufactured by C. Uyemura & Co., Ltd.) at room temperature for 60 minutes and washed with pure water to obtain a conductive film of Example 1 having a mesh-like wiring formed therein and formed by the plating method. Here, the mesh-like wiring pattern has a wiring width of 4.5 μm, a diameter Da of 200 μm (see FIG. 3), and a pitch P of 140 μm (see FIG. 3).

Example 2

0.25 g of a block-type polyisocyanate (manufactured by Asahi Kasei Corporation, DURANATE (registered trademark) SBN-70D) and 1.2 g of an acrylic resin for isocyanate curing (manufactured by DIC CORPORATION, ACRYDIC (registered trademark) A-817) were dissolved in 4.0 g of methyl ethyl ketone to obtain a curable prepolymer solution. To the solution, a solution obtained by dissolving 0.1 g of Pd (HPS-NOct$_3$Cl) manufactured by a method to be described later, 0.5 g of 3-aminopropyltrimethoxysilane (manufactured by Tokyo Chemical Industry Co., Ltd.), and 1.5 g of polyvinylpyrrolidone (manufactured by Tokyo Chemical Industry Co., Ltd., POLYVINYLPYRROLIDONE K90, viscosity average molecular weight: 630,000) as a thickener in 1.5 g of n-propanol was added. The resulting mixture was stirred until the mixture became uniform, and a catalyst ink having a solid content concentration (a ratio of solutes (other than methyl ethyl ketone and n-propanol which were the solvents) in the solution) of 39 mass %. The viscosity of the obtained ink was 3.6×10$^3$ mPa·s.

Using a pipette, the ink was printed in a pattern which is to be the pattern wiring 14 illustrated in FIG. 2 on A4300 (trade name, manufactured by TOYOBO CO., LTD.) having a thickness of 100 μm. The PET film was dried with a hot plate at 80° C. for 5 minutes, and then heated with a hot plate at 150° C. for 30 minutes to obtain a PET film provided with an electroless plating base substrate layer.

The obtained PET film was immersed for 180 seconds in an electroless plating solution heated at 80° C. and prepared as described later. Then, the film was taken out and water-washed to obtain a conductive film of Example 2 having a metal plating film formed thereon and formed by the plating method.

<Preparation of Electroless Nickel Plating Solution>

A 1 L flask was charged with 50 mL of MELPLATE (registered trademark) NI-6522LF1 (manufactured by Meltex Inc.), 150 mL of MELPLATE NI-6522LF2 (manufactured by Meltex Inc.), and 5 mL of MELPLATE NI-6522LF ADDITIVE (manufactured by Meltex Inc.), and pure water was further added thereto such that the total amount of the solution was 1 L. To this solution, a 10 vol % sulfuric acid aqueous solution was added to adjust the pH of the solution to 4.6, and an electroless plating solution was prepared.

(Manufacturing of Pd[HPS-Noct$_3$Cl])

A 1 L flask was charged with 4.3 g of palladium acetate (manufactured by Kawaken Fine Chemicals Co., Ltd.) and 200 g of chloroform and stirred until the mixture became uniform. To the solution, a solution obtained by dissolving 18.0 g of HPS-Noct$_3$Cl manufactured according to [Synthesis Example 2] described in JP2014-159620A in 200 g of chloroform was added using a dropping funnel. The inside of the dropping funnel was washed into the above-described reaction flask using 100 g of ethanol. The mixture was stirred for 17 hours at 60° C.

The mixture was cooled until the liquid temperature was reduced to 30° C. Then, the solvent was distilled. The obtained residues were dissolved in 300 g of tetrahydrofuran and cooled to 0° C. The solution was added to 6,000 g of isopropanol at 0° C. to be reprecipitation-purified. The precipitated polymer was filtered under reduced pressure and vacuum-dried at 60° C. to obtain 19.9 g of a complex (Pd[HPS-NOct$_3$Cl]) of Pd particles and a hyperbranched polymer having an ammonium group at a molecular end as a black powder.

From the result of ICP (High-Frequency Induced Coupled Plasma) light emitting analysis, the Pd content of the obtained Pd[HPS-NOct$_3$Cl] was 11 mass %. In addition, from a transmission electron microscope (TEM) image, the Pd particle diameter was about 2 to 4 nm.

Example 3

(Preparation of Silver Halide Emulsion)

To the following solution 1 kept at 38° C. with a pH of 4.5, 90% of the following solution 2 and 90% of the following 3 were added over 20 minutes while being stirred to form nuclear particles of 0.16 μm. Next, the following solutions 4 and 5 were added over 8 minutes, and the remaining 10% of the following solution 2 and the remaining 10% of the following solution 3 were added over 2 minutes to grow the particles up to 0.21 μm. 0.15 g of potassium iodide was further added and aged for 5 minutes, and the formation of the particles was terminated.

Solution 1:

| | |
|---|---|
| Water | 750 ml |
| Gelatin | 9 g |
| Sodium Chloride | 3 g |
| 1,3-Dimethylimidazolidine-2-Thione | 20 mg |
| Sodium Benzenethiosulfonate | 10 mg |
| Citric Acid | 0.7 g |

Solution 2:

| | |
|---|---|
| Water | 300 ml |
| Silver Nitrate | 150 g |

Solution 3:

| | |
|---|---|
| Water | 300 ml |
| Sodium Chloride | 38 g |
| Potassium Bromide | 32 g |
| Potassium Hexachloroiridate (III) (0.005% KCl, 20% aqueous solution) | 8 ml |
| Ammonium Hexachlororhodate (0.001% NaCl, 20% aqueous solution) | 10 ml |

Solution 4:

| | |
|---|---|
| Water | 100 ml |
| Silver Nitrate | 50 g |

Solution 5:

| | |
|---|---|
| Water | 100 ml |
| Sodium Chloride | 13 g |
| Potassium Bromide | 11 g |
| Yellow Prussiate Of Potash | 5 mg |

Thereafter, water washing was performed through a flocculation method in a usual manner. Specifically, the temperature was reduced to 35° C. and the pH was reduced using a sulfuric acid until the silver halide was precipitated (pH 3.6±0.2). Next, about 3 L of the supernatant solution was removed (first water washing). 3 L of distilled water was further added, and then a sulfuric acid was added until the silver halide was precipitated. 3 L of the supernatant solution was removed again (second water washing). The same operation as the second water washing was repeated once again (third water washing), and the water washing and desalting step was terminated. The emulsion after the water washing and desalting was adjusted to have a pH of 6.4 and a pAg of 7.5, and 3.9 g of gelatin, 10 mg of sodium benzenethiosulfonate, 3 mg of sodium benzenethiosulfinate, 15 mg of sodium thiosulfate, and 10 mg of a chlorauric acid were added to perform chemical sensitization so as to obtain optimum sensitivity at 55° C. 100 mg of 1,3,3a,7-tetraazaindene as a stabilizer and 100 mg of PROXEL (trade name, manufactured by ICI Co., Ltd.) as a preservative were added. The finally obtained emulsion was a cubic silver iodochlorobromide particle emulsion containing 0.08 mol % of silver iodide, containing 70 mol % of silver chloride and 30 mol % of silver bromide in terms of a silver chlorobromide ratio, and having an average particle diameter of 0.22 μm and a variation coefficient of 9%.

(Preparation of Composition for Forming Silver Salt Emulsion Layer)

$1.2 \times 10^{-4}$ mol/mol Ag of 1,3,3a,7-tetraazaindene, $1.2 \times 10^{-2}$ mol/mol Ag of hydroquinone, $3.0 \times 10-4$ mol/mol Ag of a citric acid, and 0.90 g/mol Ag of 2,4-dichloro-6-hydroxy-1,3,5-triazine sodium salt were added to the above-described emulsion, and the pH of the liquid to be applied was adjusted to 5.6 using a citric acid to obtain a composition for forming a silver salt emulsion layer.

(Silver Salt Emulsion Layer Forming Step)

After the PET film having a thickness of 100 μm was subjected to a corona discharge treatment, a gelatin layer having a thickness of 0.1 μm was provided as an undercoat layer on one surface of the above-described PET film, and an antihalation layer having an optical density of about 1.0 and containing a dye which is decolorized by an alkali in a developer was further provided on the undercoat layer. The above-described composition for forming a silver salt emulsion layer was applied to the above-described antihalation layer, and a gelatin layer having a thickness of 0.15 μm was further provided to obtain a polyethylene terephthalate film having a silver salt emulsion layer formed on one surface. The formed silver salt emulsion layer had a silver content of 6.0 g/m$^2$ and a gelatin content of 1.0 g/m$^2$.

(Exposure and Development Step)

One surface of the above-described PET film was exposed to parallel light from a high-pressure mercury lamp as a light source via a mask having a pattern which is to be the pattern wiring 14 illustrated in FIG. 2. The exposure was followed by development with the following developer and further development using a fixer (trade name: N3X-R for CN 16X, manufactured by FUJIFILM Corporation). The film was rinsed with pure water and dried to obtain a polyethylene terephthalate film in which a pattern wiring formed of silver thin wires and a gelatin layer were formed. The gelatin layer was formed between the silver thin wires, and in this case, the silver content in the silver thin wire was 5.4 g/m$^2$ from fluorescent X-ray analysis. In this manner, a conductive film of Example 3 was obtained by the silver salt method.

Example 4

Next, using A4300 (trade name, manufactured by TOYOBO CO., LTD.) having a thickness of 100 μm as a substrate, copper was vapor-deposited onto a surface of the substrate to form copper foil having a thickness of 8 μm.

Next, a negative resist was applied to a copper foil surface in a thickness of about 6 μm using a roll coater, and dried for 30 minutes at 90° C.

The negative resist was irradiated with ultraviolet light (UV light) at 100 mJ/cm$^2$ via a mask having a pattern which is to be the pattern wiring 14 illustrated in FIG. 2.

Next, the negative resist was subjected to a development treatment using a 3% sodium carbonate aqueous solution. Accordingly, a resist pattern was formed in a part corresponding to the pattern wiring, and the resist of other parts was removed.

Next, using a ferric chloride liquid having a specific gravity of 1.45, the exposed part of the copper foil was removed by etching, and the remaining resist was peeled. Thus, a conductive film of Example 4 was obtained by the vapor deposition method.

Example 5

Manufacturing of Silver-Plated Copper Powder (Pickling)

To 60 g of a dendritic electrolytic copper powder (manufactured by MITSUI MINING & SMELTING CO., LTD., trade name "MF-D2", diameter: 10 μm) as a raw material copper powder, 100 ml of an aqueous solution of about 5 mass % sulfuric acid was added as washing water, and the mixture was stirred for 10 minutes at 20° C. Then, the mixture was filtered and subjected to pickling. Thereafter, the washing was repeated until the filtrate became neutral. Specifically, 3 L of washing water was used in total to perform the pickling six times.

(First Plating Step)

Next, the raw material copper powder subjected to the pickling was moved to a plastic container having a volume of 1 L. An aqueous solution formed of 31.5 g ammonium carbonate, 63 g EDTA, and 250 g water was added to the container to prepare a copper dispersion liquid. In the copper dispersion liquid, an aqueous solution formed of 5.25 g silver nitrate and 32.4 g water was added while being stirred to perform silver substitution plating.

Next, the dispersion liquid after the silver substitution plating was filtered, washed, and dried to obtain a raw material copper powder in which 100 parts by mass of the raw material copper powder was plated with 5 parts by mass of silver.

Regarding the silver-plated raw material copper powder, a 50% particle diameter (D50%) was measured using MICROTRACK HRA (manufactured by NIKKISO CO., LTD.), and the result was 8.39 μm. Regarding this, a tap density was measured using the following method, and the result was 2.99 g/cm$^3$.

[Tap Density]

(i) 100 g of a silver-plated raw material copper powder (sample) is gently dropped to a 100 ml measuring cylinder using a funnel.

(ii) The measuring cylinder is mounted on a tap density measuring machine to drop the sample 600 times at a speed of 60 times/min with a drop distance of 20 mm to thus compress the sample. The volume of the sample after the compression is measured.

(iii) The tap density (g/cm$^3$) is calculated by subtracting the mass (g) of the sample from the volume (cm$^3$) after the compression.

(Cracking Step)

Next, 0.1 parts by mass of a stearic acid as a lubricant was added with respect to 100 parts by mass of the copper powder obtained in the first plating step and subjected to the first plating. The resulting material was crushed in a ball mill to obtain a crushed powder. The conditions for crushing were as follows: 20° C., number of rotations: 30 rotations per minute, and 60 minutes.

Regarding the crushed powder obtained in this manner, a 50% particle diameter (D50%) was measured using MICROTRACK HRA (manufactured by NIKKISO CO., LTD.), and the result was 8.04 μm. Regarding this, a tap density was measured using the above-described method, and the result was 3.85 g/cm$^3$.

(Second Plating Step)

Next, the crushed powder obtained in the crushing step was moved to a plastic container having a volume of 1 L.

Silver substitution plating was performed through the same method as the above-described first plating step to obtain a silver-plated copper powder.

In the second plating step, 100 parts by mass of a raw material copper powder is plated with 10 parts by mass of silver.

The silver-plated copper powder finally obtained as described above is a powder in which 100 parts by mass of the raw material copper powder is plated with 15 parts by mass of silver.

(Manufacturing of Conductive Paste (Dispersing Step))

100 parts by mass of the silver-plated copper powder manufactured as described above, 18 parts by mass of a polyester resin (TOYOBO CO., LTD., trade name "VYLON 550") as a binding resin in terms of the solid content, 4.5 parts by mass of a curing agent (blocked isocyanate (manufactured by NIPPON POLYURETHANE INDUSTRY CO., LTD., trade name "CORONATE 2516")) in terms of the solid content, and 47 parts by mass of butyl cellosolve acetate (BCA in the table) as a solvent were added and pre-mixed so as to blend the silver-plated copper powder with other components. Thereafter, the pre-mixture was dispersed by a three roll mill to obtain a conductive paste.

<Production of Laminate>

A4300 (trade name, manufactured by TOYOBO CO., LTD.) having a thickness of 100 μm was used as a substrate and the above-described conductive paste was formed using a printing method on a surface of the substrate in a pattern which is to be the pattern wiring 14 illustrated in FIG. 2. The substrate was held for 30 minutes in a constant-temperature unit at a temperature of 150° C. to cure and dry the conductive paste. In this manner, a conductive film of Example 5 was obtained by the printing method.

Example 6

In a case where Example 6 is compared with the above-described Example 1, Example 6 has a similar configuration as Example 1, except that a first wavy wire 14a and a second wavy wire 14b are in contact with each other as illustrated in FIG. 7. Accordingly, detailed description thereof will be omitted. In Example 6, the diameter Da (see FIG. 7) is 200 μm, and the pitch P (see FIG. 7) is 200 μm.

Comparative Example 1

Figure 29:
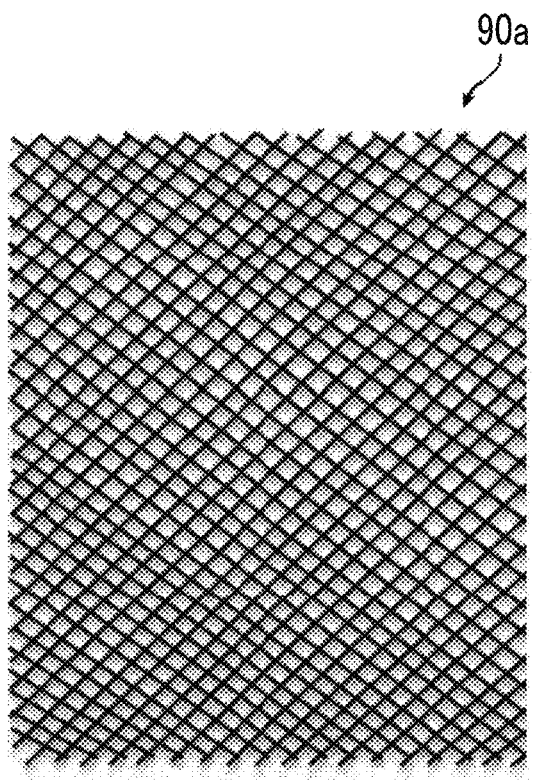
FIG. 29 is a schematic diagram illustrating a configuration of Comparative Example 1.

In a case where Comparative Example 1 is compared with the above-described Example 1, Comparative Example 1 has a similar configuration as Example 1, except that a pattern wiring 90a illustrated in FIG. 29 is formed. Accordingly, detailed description thereof will be omitted.

Figure 30:
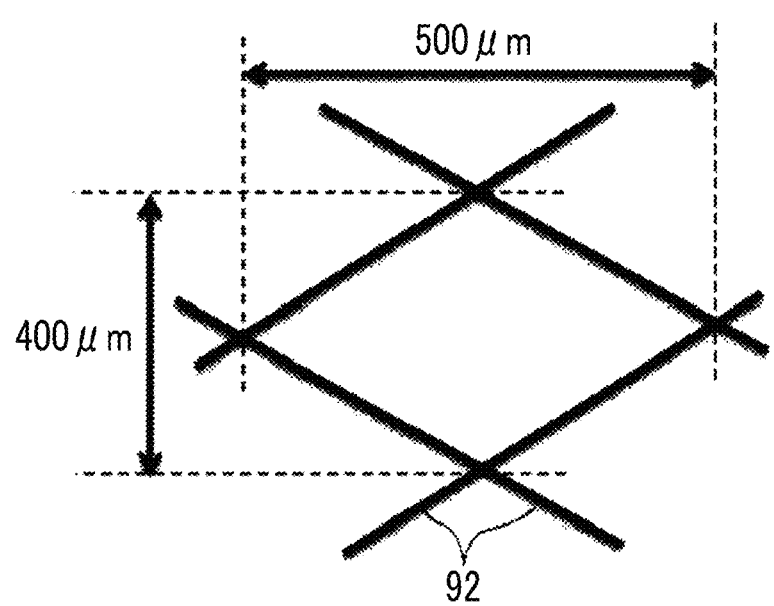
FIG. 30 is an enlarged schematic diagram illustrating the configuration of Comparative Example 1.

The pattern wiring 90a of Comparative Example 1 has a diamond pattern and is formed of linear wires 92 having a width of 0.9 μm as illustrated in FIG. 30. The opening has a size of 400 μm×500 μm.

Comparative Example 2

Figure 31:
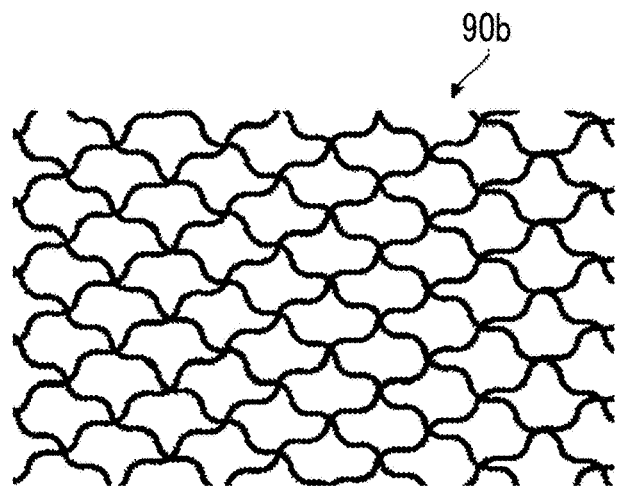
FIG. 31 is a schematic diagram illustrating a configuration of Comparative Example 2.

In a case where Comparative Example 2 is compared with the above-described Example 1, Comparative Example 2 has a similar configuration as Example 1, except that a pattern wiring 90b illustrated in FIG. 31 is formed. Accordingly, detailed description thereof will be omitted.

Figure 32:
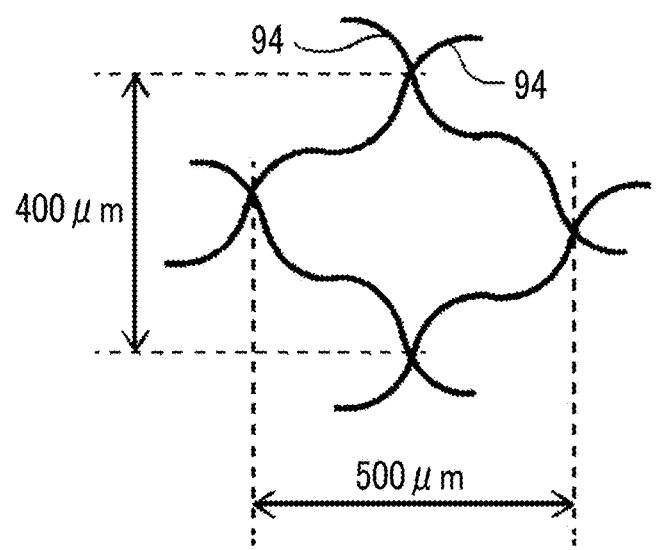
FIG. 32 is an enlarged schematic diagram illustrating the configuration of Comparative Example 2.
Figure 33:
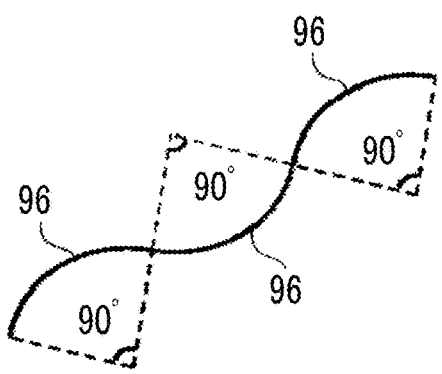
FIG. 33 is a schematic diagram illustrating the wiring of Comparative Example 2 in detail.

The pattern wiring 90b of Comparative Example 2 is formed of wavy wires 94 having a width of 0.9 μm as illustrated in FIGS. 32 and 33. A wavy wire 94 is composed of a plurality of arcs 96 of 90° connected to each other. An opening is formed by four wavy wires 94. The opening has a size of 400 μm×500 μm.

TABLE 1

| | Producing Method | Pattern | Splash Evaluation |
|---|---|---|---|
| Example 1 | Plating Method | 180° Arc | A |
| Example 2 | Plating Method | 180° Arc | A |
| Example 3 | Silver Salt Method | 180° Arc | A |
| Example 4 | Vapor Deposition Method | 180° Arc | A |
| Example 5 | Printing Method | 180° Arc | A |
| Example 6 | Printing Method | 180° Arc | A |
| Comparative Example 1 | Plating Method | Linear Wire | D |
| Comparative Example 2 | Plating Method | 90° Arc | B |

As shown in Table 1, no splash occurred in Examples 1 to 6. In Comparative Example 1 had diamond grids and splash occurred. Comparative Example 2 had a pattern using arcs, but the angle of the arcs was 90°. Accordingly, splash occurred.

Figure 34:
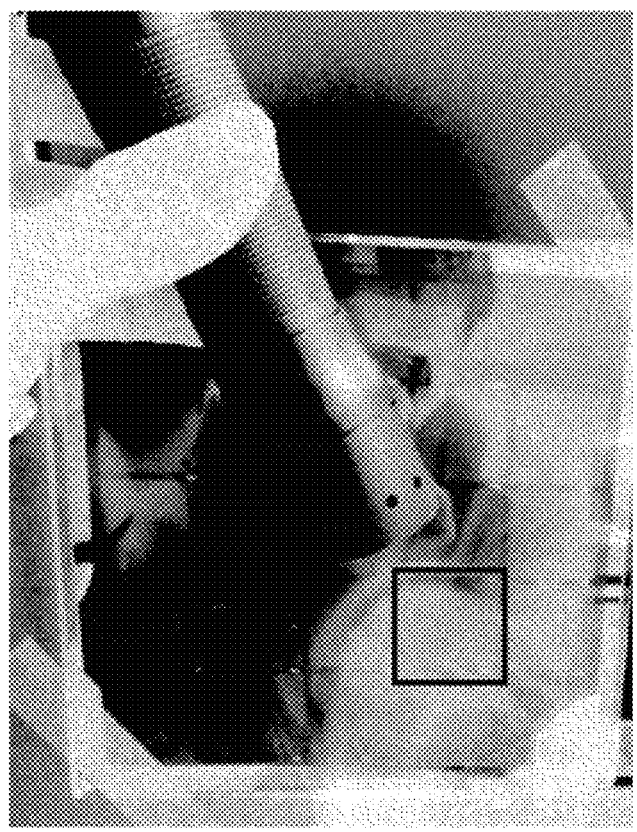
FIG. 34 is a substitute photograph for a drawing showing a result of Example 1.
Figure 35:
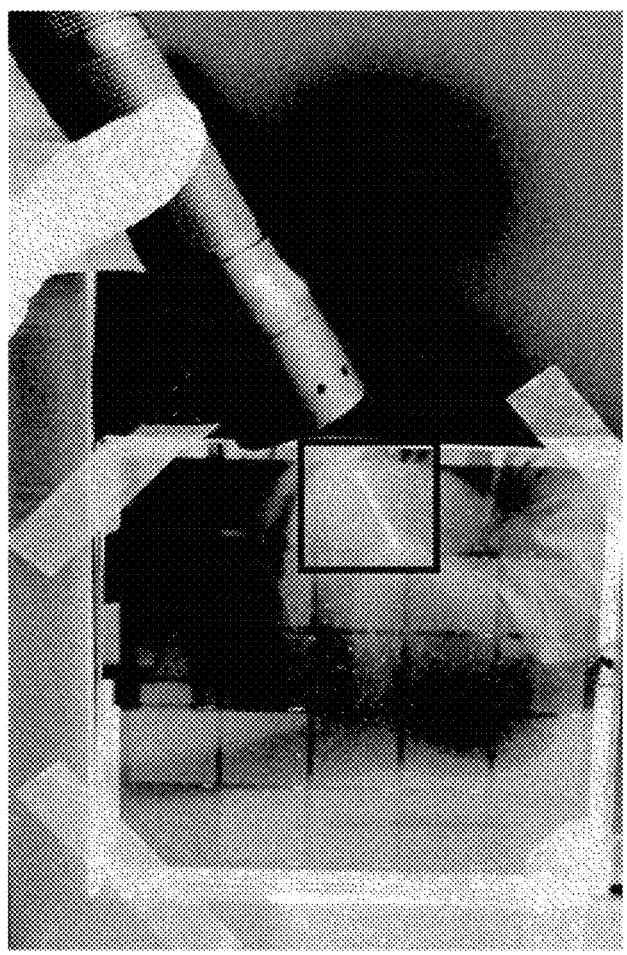
FIG. 35 is a substitute photograph for a drawing showing a result of Comparative Example 1.

The observation result of Example 1 is shown in FIG. 34, and the observation result of Comparative Example 1 is shown in FIG. 35. As shown in FIG. 34, no splash is shown in Example 1. In Comparative Example 1 strip-like reflected light is generated and splash occurs as shown in FIG. 35.

Example 2

In this example, touch panel sensors of Example 10 to 17 were produced, and drive of a touch panel sensor and splash were evaluated. Splash was evaluated with the above-described evaluation standards.

Regarding drive of a touch panel sensor, the touch panel sensor was actually touched by a finger to evaluate whether the touch could be detected. A case where the touch can be detected is represented by "A" and a case where the touch cannot be detected is represented by "B".

Example 10

In a case where Example 10 is compared with Example 1, Example 10 is produced in the same manner as Example 1, except that the pattern wiring of the pattern of the first conductive layer 60, the first terminal part 62, the first wiring 64, and the connector part 66 of the touch panel sensor 50 illustrated in FIG. 22 is formed on a front surface of a first substrate, the pattern wiring of the pattern of the second conductive layer 70, the second terminal part 72, the second wiring 74, and the connector part 76 is formed on a rear surface of a second substrate, the first substrate and the second substrate are laminated as illustrated in FIG. 11, and the controller 54 is attached using the connecting wiring 55 to form a touch panel sensor.

Example 11

In a case where Example 11 is compared with Example 10, Example 11 is produced in the same manner as Example 10, except that the first substrate and the second substrate are laminated such that the lamination angle is changed as illustrated in FIG. 12.

Example 12

In a case where Example 12 is compared with Example 10, Example 12 is produced in the same manner as Example 10, except that the first substrate and the second substrate are laminated such that the lamination angle is changed as illustrated in FIG. 13.

Example 13

In a case where Example 13 is compared with Example 2, Example 13 is produced in the same manner as Example 2, except that the pattern wiring of the pattern of the first conductive layer 60, the first terminal part 62, the first wiring 64, and the connector part 66 of the touch panel sensor 50 illustrated in FIG. 22 is formed on a front surface of a first substrate, the pattern wiring of the pattern of the second conductive layer 70, the second terminal part 72, the second wiring 74, and the connector part 76 is formed on a rear surface of a second substrate, the first substrate and the second substrate are laminated as illustrated in FIG. 11, and the controller 54 is attached using the connecting wiring 55 to form a touch panel sensor.

Example 14

In a case where Example 14 is compared with Example 3, Example 14 is produced in the same manner as Example 3, except that the pattern wiring of the pattern of the first conductive layer 60, the first terminal part 62, the first wiring 64, and the connector part 66 of the touch panel sensor 50 illustrated in FIG. 22 is formed on a front surface of a first substrate, the pattern wiring of the pattern of the second conductive layer 70, the second terminal part 72, the second wiring 74, and the connector part 76 is formed on a rear surface of a second substrate, the first substrate and the second substrate are laminated as illustrated in FIG. 11, and the controller 54 is attached using the connecting wiring 55 to form a touch panel sensor.

Example 15

In a case where Example 15 is compared with Example 4, Example 15 is produced in the same manner as Example 4, except that the pattern wiring of the pattern of the first conductive layer 60, the first terminal part 62, the first wiring 64, and the connector part 66 of the touch panel sensor 50 illustrated in FIG. 22 is formed on a front surface of a first substrate, the pattern wiring of the pattern of the second conductive layer 70, the second terminal part 72, the second wiring 74, and the connector part 76 is formed on a rear surface of a second substrate, the first substrate and the second substrate are laminated as illustrated in FIG. 11, and the controller 54 is attached using the connecting wiring 55 to form a touch panel sensor.

Example 16

In a case where Example 16 is compared with Example 5, Example 16 is produced in the same manner as Example 5, except that the pattern wiring of the pattern of the first conductive layer 60, the first terminal part 62, the first wiring 64, and the connector part 66 of the touch panel sensor 50 illustrated in FIG. 22 is formed on a front surface of a first substrate, the pattern wiring of the pattern of the second conductive layer 70, the second terminal part 72, the second wiring 74, and the connector part 76 is formed on a rear surface of a second substrate, the first substrate and the second substrate are laminated as illustrated in FIG. 11, and the controller 54 is attached using the connecting wiring 55 to form a touch panel sensor.

Example 17

In a case where Example 17 is compared with Example 10, Example 17 is produced in the same manner as Example 10, except that the diameter Da (see FIG. 7) is 200 μm and the pitch P (see FIG. 7) is 200 μm.

TABLE 2

| | Producing Method | Pattern | Lamination Method | Drive of Touch Panel Sensor | Splash Evaluation |
|---|---|---|---|---|---|
| Example 10 | Plating Method | 180° Arc | 0° (parallel) | A | A |
| Example 11 | Plating Method | 180° Arc | 90° | A | A |
| Example 12 | Plating Method | 180° Arc | 45° | A | A |
| Example 13 | Plating Method | 180° Arc | 0° (parallel) | A | A |
| Example 14 | Silver Salt Method | 180° Arc | 0° (parallel) | A | A |
| Example 15 | Vapor Deposition Method | 180° Arc | 0° (parallel) | A | A |
| Example 16 | Printing Method | 180° Arc | 0° (parallel) | A | A |
| Example 17 | Plating Method | 180° Arc | 0° (parallel) | A | A |

As shown in Table 2, all of Examples 10 to 17 could detect touch and functioned as a touch panel sensor. Furthermore, no splash occurred. With the configuration according to the invention, it was possible to obtain a touch panel sensor in which the occurrence of splash was suppressed.

EXPLANATION OF REFERENCES

10, 10*a*, 10*b*, 10*c*: conductive film
11, 11*a*, 11*b*: conductive sheet body
12, 100: substrate
12*a*, 18*a*: front surface
12*b*: rear surface
14: pattern wiring
14*a*: first wavy wire
14*b*: second wavy wire
15: conductive thin wire
16: adhesive layer
17*a*, 17*b*, 96: arc
17*c*: end part
18: protective layer
19: virtual circle
20: opening
21*a*, 21*b*, 23: intersection
22: overlap region
32: photosensitive layer
32*a*: exposure region
32*b*: non-exposure region
34: first patterned to-be-plated layer
36: patterned to-be-plated layer-containing laminate
38: metal layer
40*a*, 40*b*, 40*c*, 40*d*, 40*e*: wiring
42, 42*a*, 46: active wire
44, 44*a*, 44*b*, 48, 102: region 45, 47: outline
46a: polygonal region
46b: linear region
50: touch panel sensor
52: touch panel part
52a: sensor part
52b: peripheral wiring part
54: controller
55: connecting wiring
60: first conductive layer
62: first terminal part
64: first wiring
66, 76: connector part
70: second conductive layer
72: second terminal part
74: second wiring
90a, 90b: pattern wiring
92: linear wire
94: wavy wire
104: light source
108: reflected light
B: line
C: central line
$C_1$, $C_2$: line
Da: diameter
L: exposure light
P: pitch
Pc: distance
γ: angle
θ: central angle
φ: arrangement angle

What is claimed is:

1. A wiring comprising:
a conductive film including:
   a substrate;
   a plurality of first wavy wires which are disposed on the substrate and have semicircular arcs arranged opposite to each other in direction; and
   a plurality of second wavy wires which are disposed on the substrate, have the semicircular arcs arranged opposite to each other in direction, and are symmetrical to the first wavy wires in an arrangement direction, wherein
the arcs of each first wavy wire and the arcs of each second wavy wire have a same diameter,
a conductive sheet body is provided in which an arrangement direction of the arcs of each first wavy wire and an arrangement direction of the arcs of each second wavy wire are made parallel to each other, the arcs of each first wavy wire and the arcs of each second wavy wire are facing each other and arranged in a direction opposite to each other and the arcs of each first wavy wire and the arcs of each second wavy wire facing each other overlap each other,
the first wavy wire and the second wavy wire are made of a conductive material,
in a case where in the conductive film, at least one of the first wavy wires or the second wavy wires is cut at an angle γ which is formed with respect to the arrangement direction in a range of greater than 0° to less than 90° in terms of an absolute value to form a conduction path, the angle γ is made to coincide with an arrangement angle φ defined by |tanφ|=P/Da, where Da is a diameter of the arcs and P is an interval between a central line of the first wavy wires and a central line of the second wavy wires in a direction orthogonal to the arrangement direction, to cut the first wavy wires and the second wavy wires, and
the central line is a line connecting end parts of semicircular arcs.

2. A touch panel sensor comprising:
the wiring according to claim 1.

3. The touch panel sensor according to claim 2, wherein the conductive film is used for at least one of a sensor part or a peripheral wiring part.

4. The wiring according to claim 1, wherein
the conductive material is made of a metal or an alloy.

5. The wiring according to claim 1, wherein
a plurality of the conductive sheet bodies are laminated.

6. The wiring according to claim 1, wherein
a plurality of the conductive sheet bodies are laminated such that arrangement directions of the conductive sheet bodies coincide with each other.

7. The wiring according to claim 1, wherein
the substrate is a transparent substrate.

8. The wiring according to claim 1, wherein
the semicircular arc is an arc having a central angle of 170° to 190°.

* * * * *